United States Patent
Lu et al.

(10) Patent No.: US 11,381,554 B2
(45) Date of Patent: Jul. 5, 2022

(54) NFC DYNAMIC TOKEN WITH A SEED KEY IN SAID TOKEN

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 74 days.

(21) Appl. No.: 16/092,529

(22) PCT Filed: Mar. 29, 2017

(86) PCT No.: PCT/CN2017/078543
§ 371 (c)(1),
(2) Date: Oct. 10, 2018

(87) PCT Pub. No.: WO2017/202137
PCT Pub. Date: Nov. 30, 2017

(65) Prior Publication Data
US 2019/0132305 A1    May 2, 2019

(30) Foreign Application Priority Data

May 24, 2016 (CN) .......................... 201610349991.3
May 24, 2016 (CN) .......................... 201610350254.5

(51) Int. Cl.
*H04L 29/06* (2006.01)
*H04L 9/40* (2022.01)
(Continued)

(52) U.S. Cl.
CPC .............. *H04L 63/083* (2013.01); *H04L 9/08* (2013.01); *H04L 9/0894* (2013.01);
(Continued)

(58) Field of Classification Search
None
See application file for complete search history.

(56) References Cited

U.S. PATENT DOCUMENTS

2005/0041803 A1* 2/2005 Chateau .................. G06F 21/73
380/46
2009/0128392 A1* 5/2009 Hardacker .......... H04L 63/0492
341/175

(Continued)

*Primary Examiner* — William J. Goodchild
(74) *Attorney, Agent, or Firm* — Hammer & Associates, P.C.

(57) ABSTRACT

A working method of an NFC dynamic token, comprising the following steps: after detecting that a preset press key is triggered, the NFC dynamic token activates NFC communication and builds connection with a mobile device via NFC channel; when the NFC dynamic token receives a second instruction from the mobile device, the NFC dynamic token obtains a seed key from the second instruction, stores the seed key and sends a message that writing is successful to the mobile device; when the NFC dynamic token receives a third instruction from the mobile device, the NFC uses self-stored seed data to generate a dynamic password and sends the dynamic password to the mobile device via the NFC channel. According to the present invention, the seed key is written into the NFC dynamic token via the NFC channel, which improves security and flexibility of the dynamic token.

18 Claims, 9 Drawing Sheets

(51) Int. Cl.
    *H04L 9/32*           (2006.01)
    *H04L 9/08*           (2006.01)
    *H04W 76/14*         (2018.01)
    *H04W 4/80*          (2018.01)
    *H04W 12/06*         (2021.01)

(52) U.S. Cl.
    CPC ........ *H04L 9/3228* (2013.01); *H04L 63/0853* (2013.01); *H04W 4/80* (2018.02); *H04W 12/06* (2013.01); *H04W 76/14* (2018.02); *H04L 2209/805* (2013.01)

(56) References Cited

U.S. PATENT DOCUMENTS

| | | | |
|---|---|---|---|
| 2009/0222659 A1* | 9/2009 | Miyabayashi | H04L 63/0823 713/175 |
| 2011/0112968 A1* | 5/2011 | Florek | G07F 7/1008 705/17 |
| 2012/0069132 A1* | 3/2012 | Kato | H04L 12/1827 348/14.02 |
| 2014/0019358 A1* | 1/2014 | Priebatsch | G06Q 20/363 705/44 |
| 2014/0298029 A1* | 10/2014 | Lu | H04L 9/3271 713/172 |
| 2015/0134970 A1* | 5/2015 | Jang | H04L 9/3247 713/176 |
| 2016/0261409 A1* | 9/2016 | French | G06Q 20/3278 |

\* cited by examiner

NFC DYNAMIC TOKEN WITH A SEED KEY IN SAID TOKEN

FIELD OF THE PRESENT INVENTION

The present invention relates to an NFC (Near Field Communication) dynamic token and a working method thereof, which belongs to information security field.

In the present invention, the term "seed data" can also be called "seed key".

PRIOR ART

The dynamic token is a device for generating a dynamic password, which is widely applied in fields such as e-bank, telecommunication operator and e-business, etc. The dynamic password generated by the dynamic token can be used in identity authentication and can effectively improve security of the identity authentication. In prior art, before the dynamic token leaves a factory, a seed key, which is necessary for the dynamic token to generate the dynamic password, is written into the dynamic token by a manufacturer of the dynamic token. In the process of using the dynamic token, the seed key in the dynamic token can not be updated as the requirement of a user, which has bad flexibility and security. In prior art, after the dynamic token generates the dynamic password, it requires the user to input the dynamic password manually into a webpage or a client side, which is easy to make mistake and is bad for security.

SUMMARY OF THE PRESENT INVENTION

The object of the present invention is to provide an NFC dynamic token and a working method thereof, in which a seed key is written in the NFC dynamic token via a NFC channel, which improves security and flexibility of the dynamic token.

Therefore, according to one aspect of the present invention, there is provided a working method of an NFC dynamic token, which includes the following steps:

after detecting that a preset press key is triggered, activating, by the NFC dynamic token, NFC communication, and building connection with a mobile device via NFC channel;

when the NFC dynamic token receives a second instruction from the mobile device, obtaining, by the NFC dynamic token, a seed key from the second instruction, storing the seed key and sending a message that writing is successful to the mobile device via the NFC channel; and when the NFC dynamic token receives a third instruction from the mobile device, using, by the NFC dynamic token, self-stored seed key to generate a dynamic password and sending the dynamic password to the mobile device via the NFC channel.

According to another aspect of the present invention, there is provided an NFC dynamic token, which includes:

a detecting module configured to detect whether a preset press key is triggered;

a connecting module configured to activate NFC communication after the detecting module detects that the preset press key is triggered and build connection with the mobile device via the NFC channel;

a receiving module configured to receive a second instruction or a third instruction from the mobile device;

an obtaining module configured to obtain a seed key from the second instruction;

a storing module configured to store the seed key;

a generating module configured to use the stored seed key to generate a dynamic password; and a sending module configured to send a message that writing is successful to the mobile device via the NFC channel or send the dynamic password to the mobile device via the NFC channel.

According to the present invention, the seed key is written into the NFC dynamic token via the NFC channel, which improves security and flexibility of the dynamic token.

BRIEF DESCRIPTION OF THE ACCOMPANYING DRAWINGS

DETAILED DESCRIPTION OF THE PRESENT INVENTION

The embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of protection of the present invention.

Figure 1:
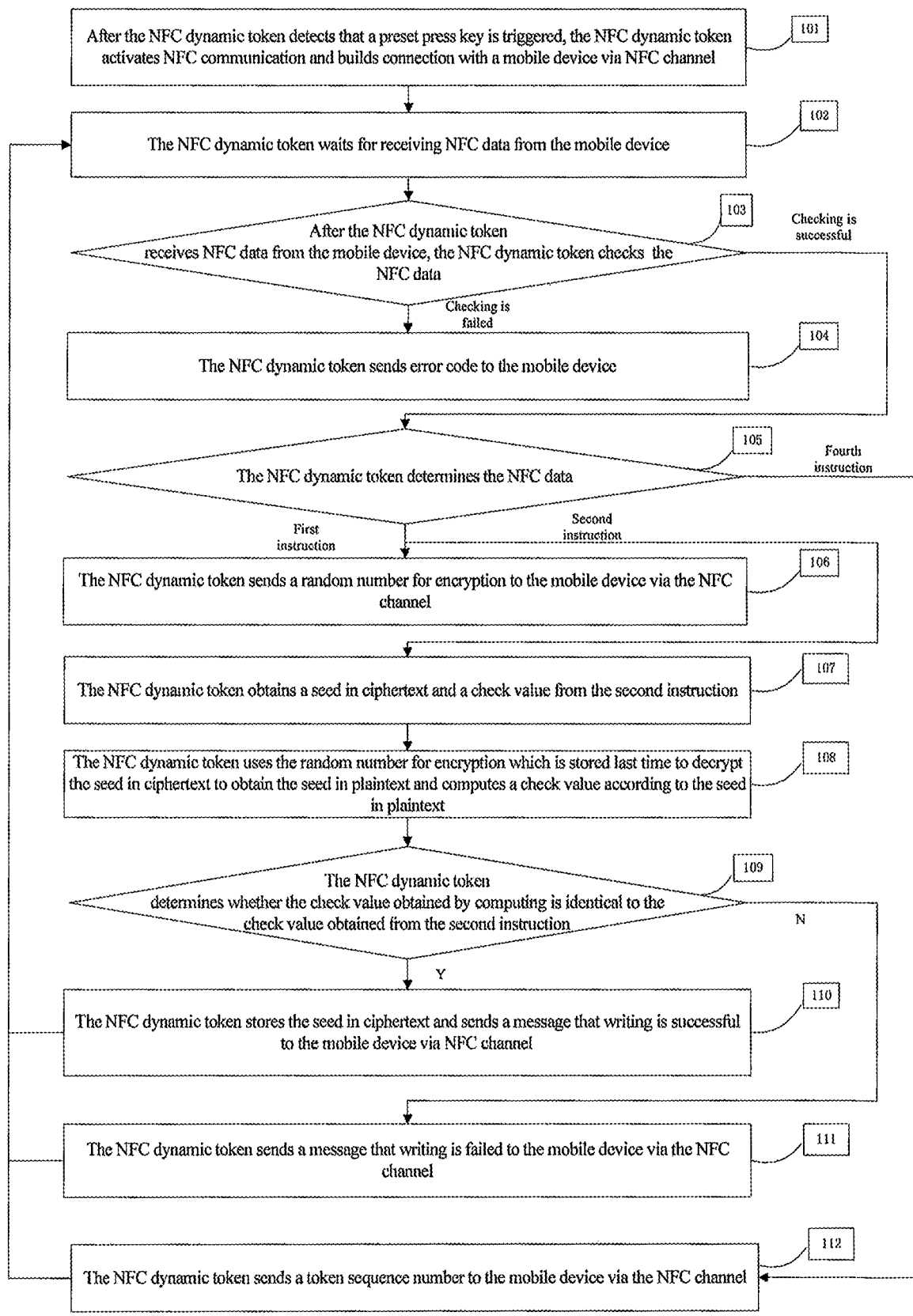
FIG. 1 is a flow chart of a method for writing a seed key into an NFC dynamic token provided by Embodiment 1 of the present invention.

Embodiment 1 of the present invention provides a method for writing a seed key in an NFC dynamic token. As shown in FIG. 1, the method includes following steps:

Step 101, after the NFC dynamic token detects that a preset press key is triggered, the NFC dynamic token activates NFC communication and builds connection with a mobile device via NFC channel.

Step 102, the NFC dynamic token waits for receiving NFC data from the mobile device.

Step 103, after the NFC dynamic token receives NFC data from the mobile device, the NFC dynamic token checks the NFC data, if checking is successful, Step 105 is executed; otherwise, Step 104 is executed.

In this case, NFC data includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 1, the length of the frame header is 1 byte, the length of the length data is 1 byte and the length of check data is 1 byte.

For example, the NFC data is "0×440E02AFCC4F6EAC971346E6066E4D09", in which the frame header is "0×44", the length data is "0×0E", the instruction data is "0×02AFCC4F6EAC971346E6066E4D", the check data is "0×09", the NFC dynamic token performs computing according to the length data "0×0E", and the instruction data "0×02AFCC4F6EAC971346E6066E4D" and determines whether the obtained check value is "0×09", if yes, checking is determined to be successful; otherwise, checking is determined to be failed.

Step 104, the NFC dynamic token sends an error code to the mobile device, go back to Step 102.

For example, the NFC dynamic token sends error code "0×BB021E35" to the mobile device.

Step 105, the NFC dynamic token determines the NFC data, if the NFC data is a first instruction, Step 106 is executed; if the NFC data is a second instruction, Step 107 is executed; if the NFC data is a fourth instruction, Step 112 is executed.

Specifically, the NFC dynamic token obtains a command code in the instruction data, determines the command code, if the command code is a third preset value, the NFC data is determined to be the first instruction; if the command code is a fourth preset value, the NFC data is the second instruction; if the command code is a fifth preset value, the NFC data is the fourth instruction.

For example, the third preset value is "0×01", the fourth preset value is "0×02", the fifth preset value is "0×04", the NFC dynamic token determines the command code in the instruction data, if the command code is "0×01", the NFC data is determined to be the first instruction; if the command code is "0×02", the NFC data is determined to be the second instruction; and if the command code is "0×04", the NFC data is determined to be the fourth instruction.

Step 106, the NFC dynamic token sends a random number for encryption to the mobile device via the NFC channel, stores the random number for encryption, go back to Step 102.

In this case, the random number for encryption can be part data intercepted from UTC second number, for example, "0×1326".

It should be noted that the mobile device stores the random number for encryption after receiving the random number for encryption from the NFC dynamic token.

Step 107, the NFC dynamic token obtains a seed in ciphertext and a check value from the second instruction.

Specifically, the NFC dynamic token obtains the seed in ciphertext and the check value from the instruction data of the second instruction.

For example, the instruction data is "0×02AFCC4F6EAC971346E6066E4D", the NFC dynamic token obtains the seed in ciphertext, i.e. "0×AFCC4F6EAC971346E6", and the check value "0×6E4D" from the instruction data.

Step 108, the NFC dynamic token uses the random number for encryption which is stored last time to decrypt the seed in ciphertext to obtain the seed in plaintext and computes a check value according to the seed in plaintext.

For example, the NFC dynamic token uses the random number for encryption "0×1326", which is stored last time, to decrypt the seed in ciphertext "0×AFCC4F6EAC971346E6" to obtain the seed in plaintext "0×8D5828922FEBFC8597" and computes the check value according to the seed in plaintext.

Step 109, the NFC dynamic token determines whether the check value obtained by computing is identical to the check value obtained from the second instruction, if yes, execute Step 110; otherwise, execute Step 111.

For example, the NFC dynamic token determines whether the check value obtained by computing is identical to the check value "0×6E4D" obtained from the second instruction.

Step 110, the NFC dynamic token stores the seed in ciphertext and sends a message that writing is successful to the mobile device via NFC channel, go back to Step 102.

For example, the NFC dynamic token stores the seed in ciphertext "0×AFCC4F6EAC971346E6" and sends a message that writing is successful, i.e. "0×BB02CCCC", to the mobile device via NFC channel.

Step 111, the NFC dynamic token sends a message that writing is failed to the mobile device via the NFC channel, go back to Step 102.

For example, the NFC dynamic token sends a message that writing is failed, i.e. "0×BB023D5B", to the mobile device.

Step 112, the NFC dynamic token sends a token sequence number to the mobile device via the NFC channel, go back to Step 102.

For example, the NFC dynamic token sends its self-stored token sequence number "15357" to the mobile device via the NFC channel.

It should be noted that, before the mobile device sends the second instruction to the NFC dynamic token, the method further includes that the mobile device obtains a seed in ciphertext and a check value from a token server and generates the second instruction according to the seed in ciphertext and the check value.

In addition, after the NFC dynamic token stores the seed in ciphertext, the method further includes that the NFC dynamic token decrypts the seed in ciphertext by using the last time stored random number for encryption to obtain the seed in plaintext and uses the seed in plaintext to generate a dynamic password.

In addition, after the NFC dynamic token activates the NFC communication, the method further includes that the NFC dynamic token clears the screen and shuts off NFC communication after detecting that a preset press key is triggered.

Correspondingly, after the NFC dynamic token clears the screen and shuts off NFC communication, the method further includes that the NFC dynamic token activates NFC communication after detecting that a preset press key is triggered, then Step 102 and subsequent steps are executed.

According to the embodiment 1 of the present invention, the seed key is written in the NFC dynamic token via the NFC channel, which improves flexibility and security of the dynamic token.

Figure 2:
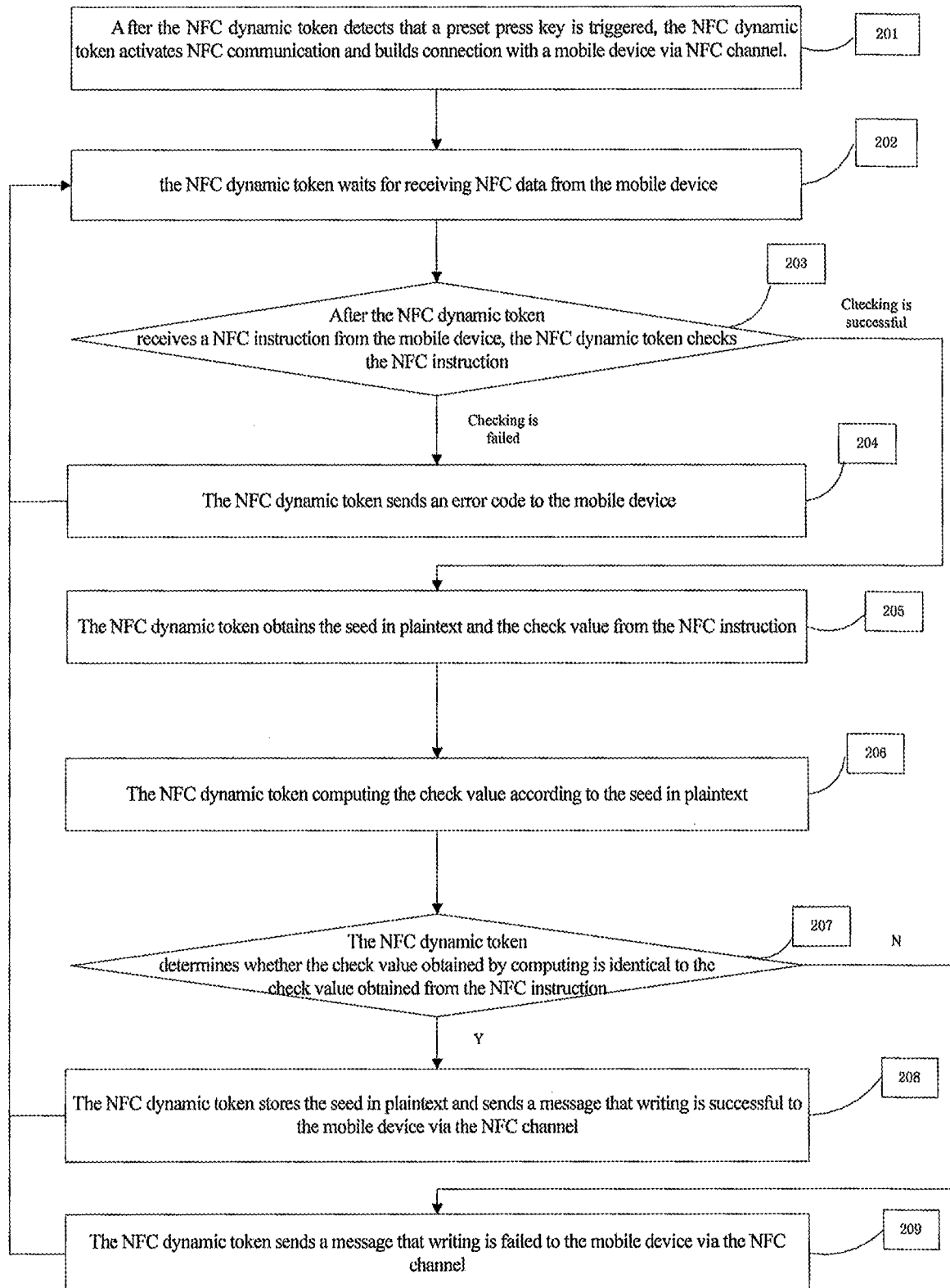
FIG. 2 is a flow chart of another method for writing a seed key into the NFC dynamic token provided by Embodiment 2 of the present invention.

Embodiment 2 of the present invention provides another working method of NFC dynamic token. As shown in FIG. 2, the working method includes the following steps:

Step 201, after the NFC dynamic token detects that a preset press key is triggered, the NFC dynamic token activates NFC communication and builds connection with a mobile device via NFC channel.

Step 202, the NFC dynamic token waits for receiving NFC data from the mobile device.

Step 203, after the NFC dynamic token receives an NFC instruction from the mobile device, the NFC dynamic token checks the NFC instruction, if checking is successful, Step 205 is executed; otherwise, Step 204 is executed.

In this case, the NFC instruction includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC instruction is determined to be successful; otherwise, checking the NFC instruction is determined to be failed.

In Embodiment 2, the length of the frame header is 1 byte, the length of the length data is 1 byte, the length of the checking data is 1 byte.

For example, the NFC instruction is "0×440E028D5828922FEBFC8597063B5315", in which the frame header is "0×44", the length data is "0×0E", the instruction data is "0×028D5828922FEBFC8597063B53", the check data is "0×15", the NFC dynamic token performs computing according to the length data "0×0E" and the instruction data "0×028D5828922FEBFC8597063B53", determines whether the check value obtained by computing is "0×15", if yes, checking is determined to be successful; otherwise, checking is determined to be failed.

Step 204, the NFC dynamic token sends an error code to the mobile device, go back to Step 202.

For example, the NFC dynamic token sends the error code "0×BB021E35" to the mobile device.

Step 205, the NFC dynamic token obtains the seed in plaintext and the check value from the NFC instruction.

Specifically, the NFC dynamic token obtains the seed in the plaintext and the check value from the instruction data of the NFC instruction.

For example, the instruction data is "0×028D5828922FEBFC8597063B53", the NFC dynamic token obtains the seed in ciphertext "0×8D5828922FEBFC8597" and the check value "0×3B53" from the instruction data.

Step 206, the NFC dynamic token computes the check value according to the seed in plaintext.

For example, the NFC dynamic token computes the check value according to the seed in plaintext "0×8D5828922FEBFC8597".

Step 207, the NFC dynamic token determines whether the check value obtained by computing is identical to the check value obtained from the NFC instruction, if yes, Step 208 is executed; otherwise, Step 209 is executed.

For example, the NFC dynamic token determines whether the check value obtained by computing is identical to the check value "0×3B53" obtained from the NFC instruction.

Step 208, the NFC dynamic token stores the seed in plaintext and sends a message that writing is successful to the mobile device via the NFC channel, go back to Step 202.

For example, the NFC dynamic token stores the seed in plaintext "0×8D5828922FEBFC8597", sends the message that writing is successful, i.e. "0×BB02CCCC", to the mobile device via the NFC channel.

Step 209, the NFC dynamic token sends a message that writing is failed to the mobile device via the NFC channel, go back to Step 202.

For example, the NFC dynamic token sends the message that writing is failed "0×BB023D5B" to the mobile device.

It should be noted that, before the mobile device sends the NFC instruction to the NFC dynamic token, the method further includes that the mobile device obtains the seed in plaintext and the check value from the token server, generates the NFC instruction according to the seed in plaintext and the check value.

In addition, after the NFC dynamic token activates NFC communication, the method further includes that the NFC dynamic token clears screen and shuts off the NFC communication after the NFC dynamic token detects that the preset press key is triggered.

Correspondingly, after the NFC dynamic token clears the screen and shuts off the NFC communication, the method further includes that, the NFC dynamic token activates NFC communication after the NFC dynamic token detects that the preset press key is triggered, then Step 202 and subsequent steps are executed.

According to the embodiment 2 of the present invention, the seed key is written in the NFC dynamic token via the NFC channel, which improves flexibility and security of the dynamic token.

Figure 3:
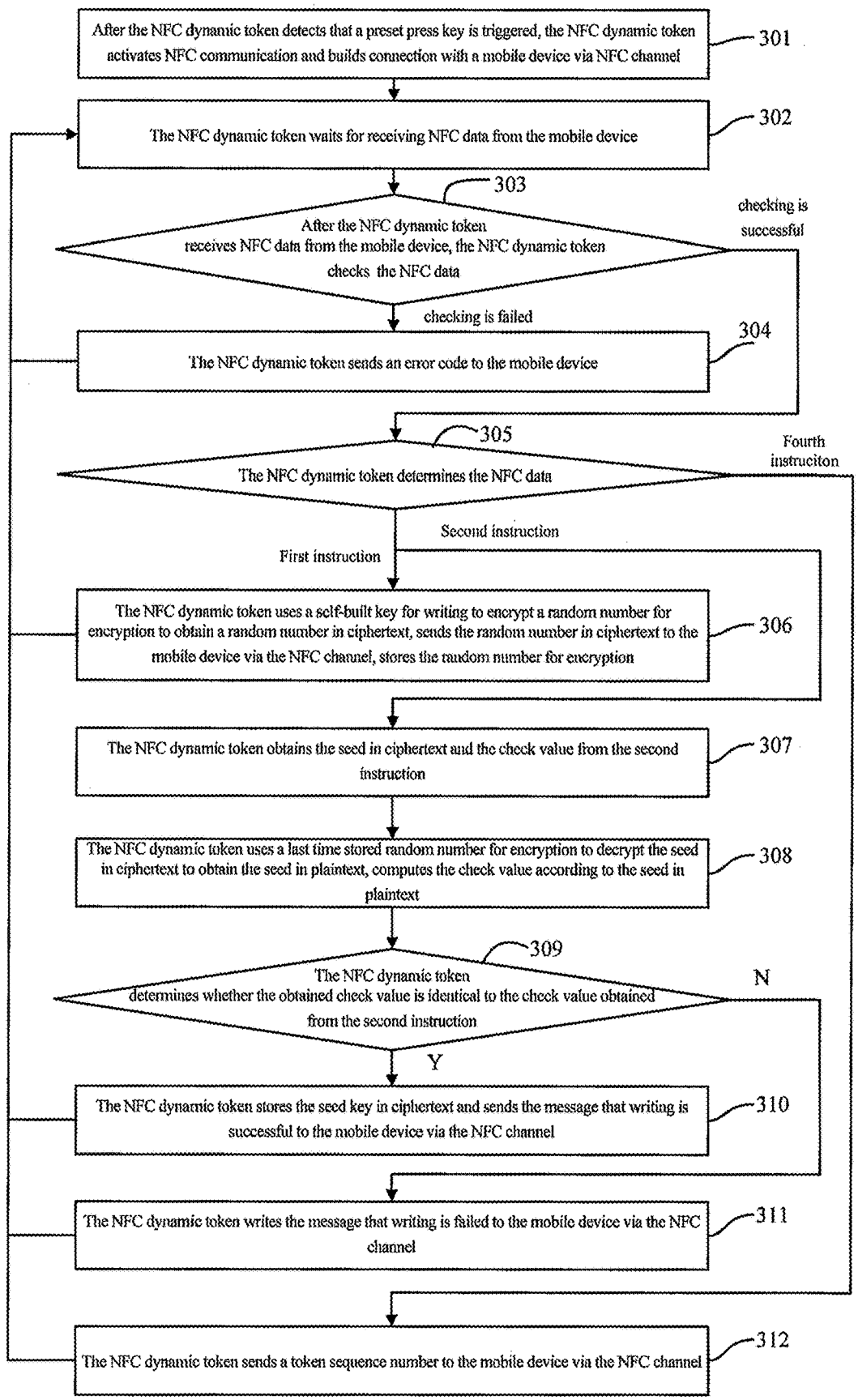
FIG. 3 is a flow chart of another method for writing a seed key into the NFC dynamic token provided by Embodiment 3 of the present invention.

Embodiment 3 provides another method for writing the seed key in the NFC dynamic token. As shown in FIG. 3, the method includes following steps:

Step 301, after the NFC dynamic token detects that a preset press key is triggered, the NFC dynamic token activates NFC communication and builds connection with a mobile device via NFC channel.

Step 302, the NFC dynamic token waits for receiving NFC data from the mobile device.

Step 303, after the NFC dynamic token receives NFC data from the mobile device, the NFC dynamic token checks the NFC data, if checking is successful, Step 305 is executed; otherwise, Step 304 is executed.

In this case, NFC data includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 3, the length of the frame header is 1 byte, the length of the length data is 1 byte, the length of check data is 1 byte.

For example, the NFC data is "0×440E02AFCC4F6EAC971346E6066E4D09", in which the frame header is "0×44", the length data is "0×0E", the instruction data is "0×02AFCC4F6EAC971346E6066E4D", the check data is "0×09", the NFC dynamic token performs computing according to the length data "0×0E" and the instruction data "0×02AFCC4F6EAC971346E6066E4D" and determines whether the obtained check value is "0×09", if yes, checking is determined to be successful; otherwise, checking is determined to be failed.

Step 304, the NFC dynamic token sends an error code to the mobile device, go back to Step 302.

For example, the NFC dynamic token sends the error code "0xBB021E35" to the mobile device.

Step 305, the NFC dynamic token determines the NFC data, if the NFC data is a first instruction, execute Step 306, if the NFC data is a second instruction, execute Step 307; if the NFC data is a fourth instruction, execute Step 312.

Specifically, the NFC dynamic token obtains a command code in the instruction data, determines the command code, if the command code is a third preset value, the NFC data is determined to be the first instruction; if the command code is a fourth preset value, the NFC data is determined to be the second instruction; and if the command code is a fifth preset value, the NFC data is determined to be the fourth instruction.

For example, the third preset value is "0x01", the fourth preset value is "0x02", the fifth preset value is "0x04"; the NFC dynamic token determines the command code in the instruction data, if the command code is "0x01", the NFC data is determined to be the first instruction; if the command code is "0x02", the NFC data is determined to be the second instruction; and if the command code is "0x04", the NFC data is determined to be the fourth instruction.

Step 306, the NFC dynamic token uses a self-built key for writing to encrypt a random number for encryption to obtain a random number in ciphertext, sends the random number in ciphertext to the mobile device via the NFC channel, stores the random number for encryption, go back to Step 302.

In this case, the random number for encryption can be part data intercepted from UTC second number, for example, "0x1326"; the NFC dynamic token uses the self-built key for writing to encrypt the random number for encryption to obtain the random number in ciphertext, for example, "0x5B79".

It should be noted that, after the mobile device receives the random number in ciphertext from the NFC dynamic token, the mobile device sends the random number in ciphertext to the token server; the token server decrypts the random number in ciphertext with its self-stored key for writing to obtain the number for encryption and the token server uses the random number for encryption to encrypt its generated seed in plaintext to obtain the seed in ciphertext; the seed in ciphertext is sent to the NFC dynamic token by the mobile device.

Step 307, the NFC dynamic token obtains the seed in ciphertext and the check value from the second instruction.

Specifically, the NFC dynamic token obtains the seed in ciphertext and the check value from the instruction data of the second instruction.

For example, the instruction data is "0x02AFCC4F6EAC971346E6066E4D", the NFC dynamic token obtains the seed in ciphertext, i.e. "0xAFCC4F6EAC971346E6", and the check value "0x6E4D" from the instruction data.

Step 308, the NFC dynamic token uses a last time stored random number for encryption to decrypt the seed in ciphertext to obtain the seed in plaintext, computes the check value according to the seed in plaintext.

For example, the NFC dynamic token uses the last time stored random number for encryption, i.e. "0x1326" to decrypt the seed in ciphertext "0xAFCC4F6EAC971346E6" so as to obtain the seed in plaintext "0x8D5828922FEBFC8597" and computes the check value according to the seed in plaintext.

Step 309, the NFC dynamic token determines whether the obtained check value is identical to the check value obtained from the second instruction, if yes, Step 310 is executed; otherwise, Step 311 is executed.

For example, the NFC dynamic token determines whether the check value obtained by computing is identical to the check value "0x6E4D" obtained from the second instruction.

Step 310, the NFC dynamic token stores the seed key in ciphertext and sends the message that writing is successful to the mobile device via the NFC channel, go back to Step 302.

For example, the NFC dynamic token stores the seed in ciphertext, i.e. "0xAFCC4F6EAC971346E6", and writes the message that writing is successful, i.e. "0xBB02CCCC", to the mobile device via the NFC channel.

Step 311, the NFC dynamic token writes the message that writing is failed to the mobile device via the NFC channel, go back to Step 302.

For example, the NFC dynamic token writes the message that writing is failed, i.e. "0xBB023D5B", to the mobile device.

Step 312, the NFC dynamic token sends a token sequence number to the mobile device via the NFC channel, go back to Step 302.

For example, the NFC dynamic token sends its self-stored token sequence number, i.e. "15357", to the mobile device via the NFC channel It should be noted that, before the mobile device sends the second instruction to the NFC dynamic token, the method further includes that the mobile device obtains a seed in ciphertext and the check value from the token server and generates the second instruction according to the seed in ciphertext and the check value.

In addition, after the NFC dynamic token stores the seed in ciphertext, the method further includes that the NFC dynamic token uses the last time stored random number for encryption to decrypt the seed in ciphertext to obtain the seed in plaintext and uses the seed in the plaintext to generate the dynamic token.

In addition, after the NFC dynamic token activates NFC communication, the method further includes that, after the NFC dynamic token detects that the preset press key is triggered, the NFC dynamic token clears screen and shut off the NFC communication.

Correspondingly, after the NFC dynamic token clears the screen and shuts off the NFC communication, the method further includes that the NFC dynamic token activates NFC communication after the NFC dynamic token detects that the preset press key is triggered, then Step 302 and subsequent steps are executed.

According to the embodiment 3 of the present invention, the seed key is written in the NFC dynamic token via the NFC channel, which improves flexibility and security of the dynamic token.

Figure 4:
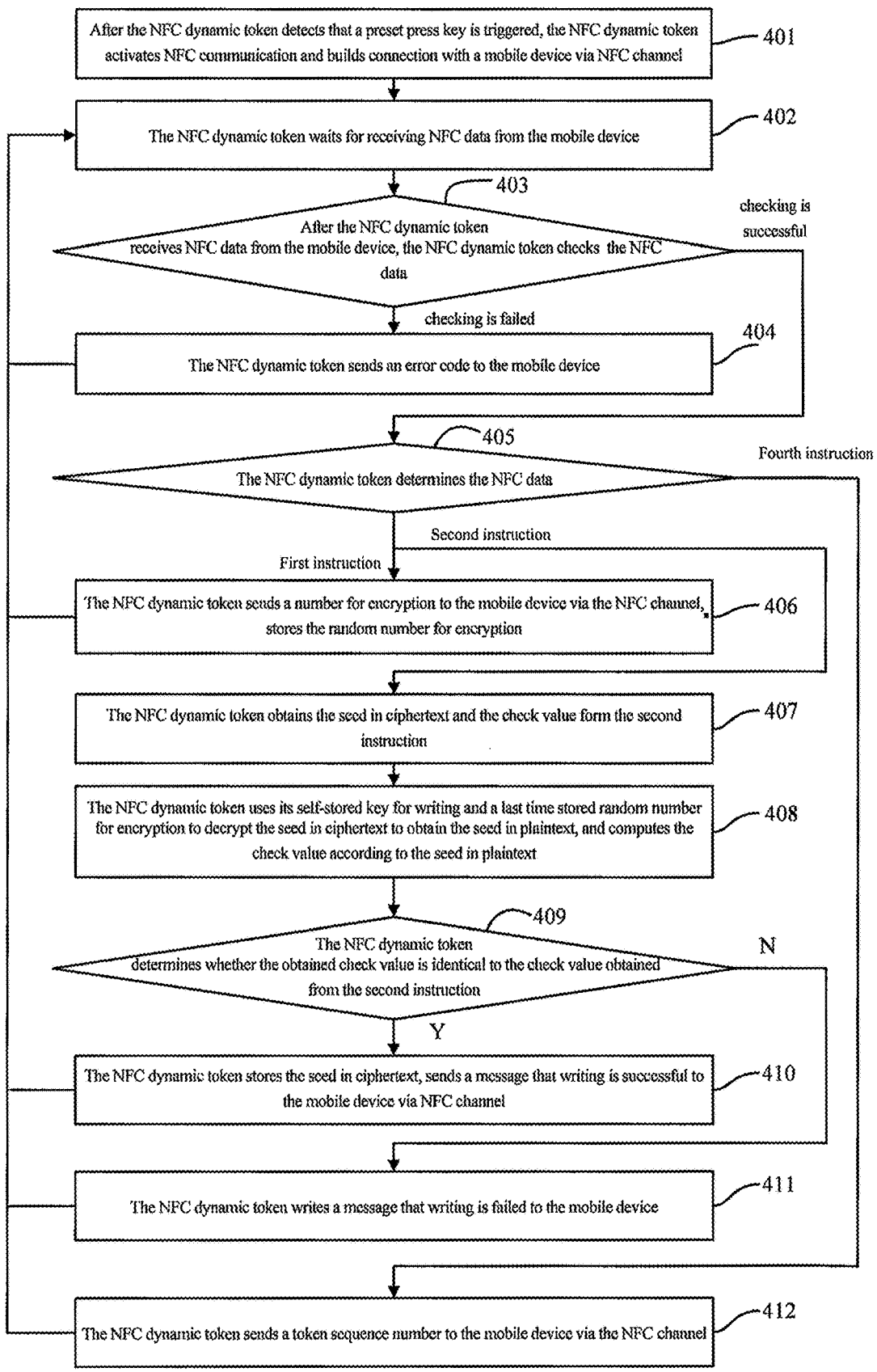
FIG. 4 is a flow chart of another method for writing a seed key into the NFC dynamic token provided by Embodiment 4 of the present invention.

Embodiment 4 provides another method for writing the seed key in the NFC dynamic token. As shown in FIG. 4, the method includes following steps:

Step 401, after the NFC dynamic token detects that a preset press key is triggered, the NFC dynamic token activates NFC communication and builds connection with a mobile device via NFC channel.

Step 402, the NFC dynamic token waits for receiving NFC data from the mobile device.

Step 403, after the NFC dynamic token receives NFC data from the mobile device, the NFC dynamic token checks the NFC data, if checking is successful, Step 405 is executed; otherwise, Step 404 is executed.

In this case, the NFC data includes a frame header, length data, instruction data and check data; value of the length data is sum of length of instruction data and length of check data;

correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 4, the length of the frame header is 1 byte, the length of the length data is 1 byte, the length of check data is 1 byte.

For example, the NFC data is "0×440E02AFCC4F6EAC971346E6066E4D09", in while the frame header is "0×44", the length data is "0×0E", the instruction data is "0×02AFCC4F6EAC971346E6066E4D", the check data is "0×09", the NFC dynamic token performs computing according to the length data "0×0E" and the instruction data "0×02AFCC4F6EAC971346E6066E4D" and determines whether the obtained check value is "0×09", if yes, checking is determined to be successful; otherwise, checking is determined to be failed.

Step 404, the NFC dynamic token sends an error code to the mobile device, go back to Step 402.

For example, the NFC dynamic token sends the error code "0×BB021E35" to the mobile device.

Step 405, the NFC dynamic token determines the NFC data, if the NFC data is a first instruction, execute Step 406, if the NFC data is a second instruction, execute Step 407; if the NFC data is a fourth instruction, execute Step 412.

Specifically, the NFC dynamic token obtains a command code in the instruction data, determines the command code, if the command code is a third preset value, the NFC data is determined to be the first instruction; if the command code is a fourth preset value, the NFC data is determined to be a second instruction; and if the command code is a fifth preset value, the NFC data is determined to be a fourth instruction.

For example, the third preset value is "0×01", the fourth preset value is "0×02", the fifth preset value is "0×04"; the NFC dynamic token determines the command code in the instruction data, if the command code is "0×01", the NFC data is determined to be the first instruction; if the command code is "0×02", the NFC data is determined to be the second instruction; and if the command code is "0×04", the NFC data is determined to be the fourth instruction.

Step 406, the NFC dynamic token sends a random number for encryption to the mobile device via the NFC channel, stores the random number for encryption and go back to Step 402.

In this case, the random number can be part data intercepted from UTC second number, for example, "0×1326".

It should be noted that the mobile device stores the random number for encryption after the mobile device receives the encrypted random number of the NFC dynamic token.

Step 407, the NFC dynamic token obtains the seed in ciphertext and the check value from the second instruction.

Specifically, the NFC dynamic token can obtain the seed in ciphertext and the check value from the instruction data of the second instruction.

For example, the instruction data is "0×02AFCC4F6EAC971346E6066E4D", the NFC dynamic token obtains the seed in ciphertext, i.e. "0×AFCC4F6EAC971346E6", and the check value "0×6E4D" from the instruction data.

Step 408, the NFC dynamic token uses its self-stored key for writing and a last time stored random number for encryption to decrypt the seed in ciphertext to obtain the seed in plaintext, and computes the check value according to the seed in plaintext.

For example, the NFC dynamic token uses its self-stored key for writing and a last time stored random number for encryption, i.e. "0×1326", to decrypt the seed in ciphertext, i.e. "0×AFCC4F6EAC971346E6" to obtain the seed in plaintext, i.e. "0×8D5828922FEBFC8597", and computes the check value according to the seed in plaintext.

It should be noted that, a token server stores a key for writing which is identical to the self-stored key for writing of the NFC token; correspondingly, the token server uses the self-stored key for writing and the random number for encryption from the mobile device to encrypt the seed in plaintext which is generated by the token server to obtain the seed in ciphertext and sends the seed in ciphertext to the NFC dynamic token.

Step 409, the NFC dynamic token determines whether the obtained check value is identical to the check value obtained from the second instruction, if yes, execute Step 410; otherwise, execute Step 411.

For example, the NFC dynamic token determines whether the check value obtained by computing is identical to the check value "0×6E4D" obtained from the second instruction.

Step 410, the NFC dynamic token stores the seed in ciphertext, sends a message that writing is successful to the mobile device via NFC channel, go back to Step 402.

For example, the NFC dynamic token stores the seed in ciphertext, i.e. "0×AFCC4F6EAC971346E6", sends a message that writing is successful, i.e. "0×BB02CCCC", to the mobile device via the NFC channel.

Step 411, the NFC dynamic token writes a message that writing is failed to the mobile device, go back to Step 402.

For example, the NFC dynamic token sends the message that writing is failed, i.e. "0×BB023D5B" to the mobile device.

Step 412, the NFC dynamic token sends a token sequence number to the mobile device via the NFC channel, go back to Step 402.

For example, the NFC dynamic token sends its self-stored token sequence number, i.e. "15357", to the mobile device via the NFC channel.

It should be noted that, before the mobile device sends the second instruction to the NFC dynamic token, the method further includes that the mobile device obtains a seed in ciphertext and the check value from the token server and generates the second instruction according to the seed in ciphertext and the check value.

In addition, after the NFC dynamic token stores the seed in ciphertext, the method further includes that the NFC dynamic token uses its self-stored key for writing and the last time stored random number for encryption to decrypt the seed in ciphertext to obtain the seed in plaintext and uses the seed in the plaintext to generate the dynamic token.

In addition, after the NFC dynamic token activates NFC communication, the method further includes that, after the NFC dynamic token detects that the preset press key is triggered, the NFC dynamic token clears screen and shuts off the NFC communication.

Correspondingly, after the NFC dynamic token clears the screen and shuts off the NFC communication, the method further includes that the NFC dynamic token activates NFC communication after the NFC dynamic token detects that the preset press key is triggered, then Step 402 and subsequent steps are executed.

According to the embodiment 4 of the present invention, the seed key is written in the NFC dynamic token via the NFC channel, which improves flexibility and security of the dynamic token.

Figure 5:
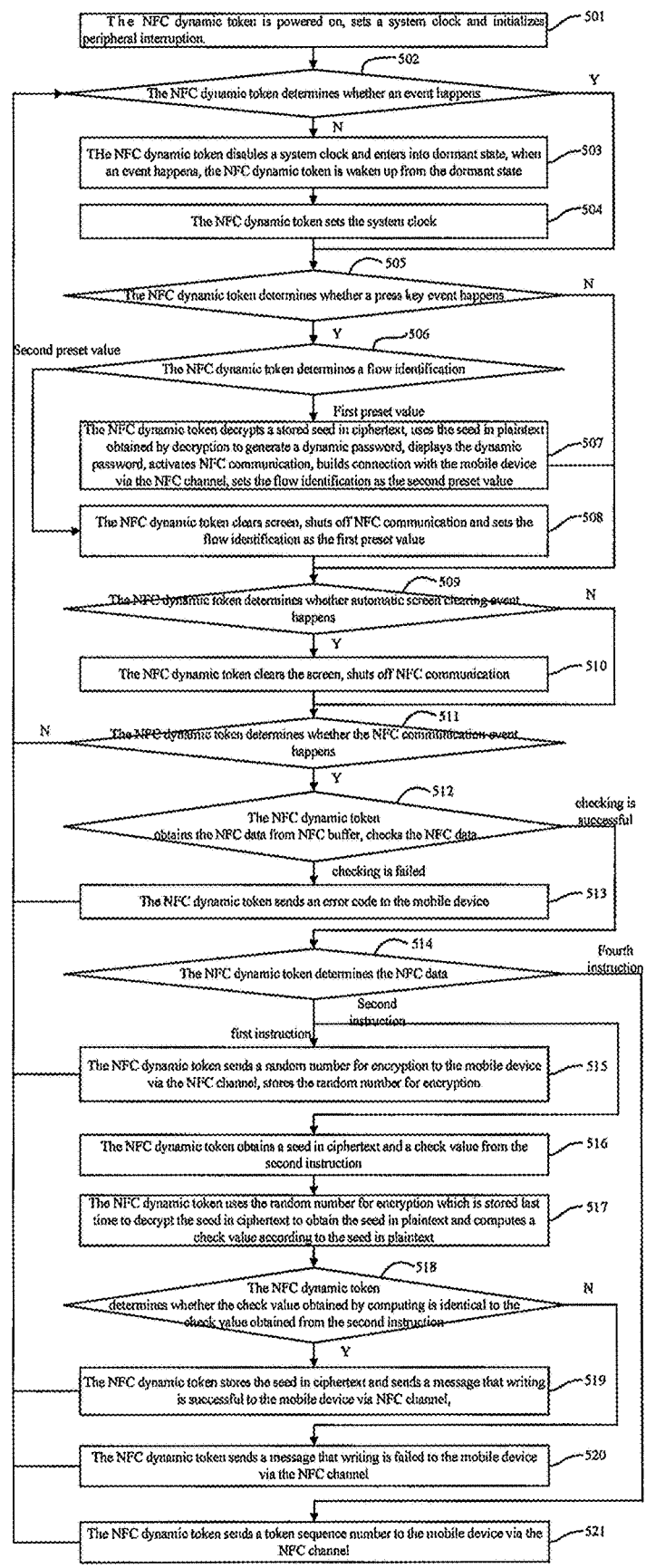
FIG. 5 is a flow chart of another method for writing a seed key into the NFC dynamic token provided by Embodiment 5 of the present invention.

Embodiment 5 of the present invention provides another method for writing the seed key in the NFC dynamic token. As shown in FIG. 5, the method includes following steps.

Step 501, the NFC dynamic token is powered on, sets a system clock and initializes peripheral interruption.

Step 502, the NFC dynamic token determines whether an event happens, if yes, Step 505 is executed; otherwise, Step 503 is executed.

Specifically, the NFC dynamic token determines whether an event identification is set, if yes, an event is determined to be happened; otherwise, no event is determined to be happened.

Step 503, the NFC dynamic token disables a system clock and enters into dormant state; when an event happens, the NFC dynamic token is waken up from the dormant state and Step 504 is executed.

Step 504, the NFC dynamic token sets the system clock and executes Step 505.

Step 505, the NFC dynamic token determines whether a press key event happens, if yes, Step 506 is executed; otherwise, Step 509 is executed.

Specifically, the NFC dynamic token determines whether a press key interruption identification is set, if yes, a press key event is happened; otherwise, no press key event is happened.

It should be noted that the NFC dynamic token will reset the press key interruption identification after determining that the press key interruption identification is set.

Step 506, the NFC dynamic token determines a flow identification, if the flow identification is a first preset value, Step 507 is executed; if the flow identification is a second preset value, Step 508 is executed.

For example, the first preset value is "01"; the second preset value is "02".

Step 507, the NFC dynamic token decrypts a stored seed in ciphertext, uses the seed in plaintext obtained by decryption to generate a dynamic password, displays the dynamic password, activates NFC communication, builds connection with the mobile device via the NFC channel, sets the flow identification as the second preset value, and execute Step 509.

Specifically, the NFC dynamic token uses a last time stored random number for encryption, decrypts its self-stored seed in ciphertext to obtain the seed in plaintext and uses the seed in plaintext to generate a dynamic password.

For example, the NFC dynamic token uses the last time stored random number for encryption, i.e. "0x1326" to decrypt the seed in ciphertext, i.e. "0xAFCC4F6EAC971346E6" to obtain the seed in plaintext, i.e. "0x8D5828922FEBFC8597", generates a dynamic password "355569" according to the seed in plaintext, generates the dynamic password "355569" and sets the flow identification as "02".

Step 508, the NFC dynamic token clears screen, shuts off NFC communication and sets the flow identification as the first preset value; Step 509 is executed.

For example, the NFC dynamic token sets the flow identification as "01".

Step 509, the NFC dynamic token determines whether an automatic screen clearing event happens, if yes, Step 510 is executed; otherwise, Step 511 is executed.

Specifically, the NFC dynamic token determines whether an automatic screen clearing identification is set, if yes, it determines that automatic screen clearing event happens, otherwise, no automatic screen clearing event happens.

It should be noted that, after determining that the automatic screen clearing identification is set, the NFC dynamic token will reset the automatic screen clearing identification.

Step 510, the NFC dynamic token clears the screen, shuts off NFC communication, then Step 511 is executed.

Step 511, the NFC dynamic token determines whether the NFC communication event happens, if yes, Step 512 is executed; otherwise, go back to Step 502.

Specifically, the NFC dynamic token determines whether the NFC communication interruption identification is set, if yes, an NFC communication event is determined to be happened; otherwise, no NFC communication event is determined to be happened.

It should be noted that, after determining that the NFC communication interruption identification is set, the NFC dynamic token will reset the NFC communication interruption identification.

In addition, after the press key interruption identification, the NFC communication interruption identification and the automatic screen clearing identification are all reset, the NFC dynamic token resets the event identification.

Step 512, the NFC dynamic token obtains the NFC data from NFC buffer, checks the NFC data, if checking is successful, Step 514 is executed; otherwise, Step 513 is executed.

In this case, the NFC data includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 5, the length of the frame header is 1 byte, the length of the length data is 1 byte, the length of check data is 1 byte.

For example, the NFC data is "0x440E02AFCC4F6EAC971346E6066E4D09", in which the frame header is "0x44", the length data is "0x0E", the instruction data is "0x02AFCC4F6EAC971346E6066E4D", the check data is "0x09", the NFC dynamic token performs computing according to the length data "0x0E" and the instruction data "0x02AFCC4F6EAC971346E6066E4D" and determines whether the obtained check value is "0x09", if yes, checking is determined to be successful; otherwise, checking is determined to be failed.

Step 513, the NFC dynamic token sends an error code to the mobile device, go back to Step 502.

For example, the NFC dynamic token sends the error code "0xBB021E35" to the mobile device.

Step 514, the NFC dynamic token determines the NFC data, if the NFC data is a first instruction, execute Step 515, if the NFC data is a second instruction, execute Step 516; if the NFC data is a fourth instruction, execute Step 521.

Specifically, the NFC dynamic token obtains a command code in the instruction data, determines the command code, if the command code is a third preset value, the NFC data is determined to be the first instruction; if the command code is a fourth preset value, the NFC data is determined to be the second instruction; and if the command code is a fifth preset value, the NFC data is determined to be the fourth instruction.

For example, the third preset value is "0×01", the fourth preset value is "0×02", the fifth preset value is "0×04"; the NFC dynamic token determines the command code in the instruction data, if the command code is "0×01", the NFC data is determined to be the first instruction; if the command code is "0×02", the NFC data is determined to be the second instruction; if the command code is "0×04", the NFC data is determined to be the fourth instruction.

Step 515, the NFC dynamic token sends a random number for encryption to the mobile device via the NFC channel, stores the random number for encryption, go back to Step 502.

In this case, the random number for encryption can be part data intercepted from UTC second number, for example, "0×1326".

Step 516, the NFC dynamic token obtains a seed in ciphertext and a check value from the second instruction.

Specifically, the NFC dynamic token obtains the seed in ciphertext and the check value from the instruction data of the second instruction.

For example, the instruction data is "0×02AFCC4F6EAC971346E6066E4D", the NFC dynamic token obtains the seed in the ciphertext "0×AFCC4F6EAC971346E6" and the check value "0×6E4D" from the instruction data.

Step 517, the NFC dynamic token uses the random number for encryption which is stored last time to decrypt the seed in ciphertext to obtain the seed in plaintext and computes a check value according to the seed in plaintext.

For example, the NFC dynamic token uses the random number for encryption "0×1326", which is stored last time, to decrypt the seed in ciphertext "0×AFCC4F6EAC971346E6" to obtain the seed in plaintext "0×8D5828922FEBFC8597" and computes the check value according to the seed in plaintext.

Step 518, the NFC dynamic token determines whether the check value obtained by computing is identical to the check value obtained from the second instruction, if yes, execute Step 519; otherwise, execute Step 520.

For example, the NFC dynamic token determines whether the check value obtained by computing is identical to the check value "0×6E4D" obtained from the second instruction.

Step 519, the NFC dynamic token stores the seed in ciphertext and sends a message that writing is successful to the mobile device via NFC channel, go back to Step 502.

For example, the NFC dynamic token decrypts the seed in ciphertext, i.e. "0×AFCC4F6EAC971346E6", sends the message that writing is successful, i.e. "0×BB02CCCC", to the mobile device via the NFC channel.

Step 520, the NFC dynamic token sends a message that writing is failed to the mobile device via the NFC channel, go back to Step 502.

For example, the NFC dynamic token sends a message that writing is failed, i.e. "0×BB023D5B", to the mobile device.

Step 521, the NFC dynamic token sends a token sequence number to the mobile device via the NFC channel, go back to Step 502.

For example, the NFC dynamic token sends its self-stored token sequence number "15357" to the mobile device via the NFC channel.

It should be noted that, Embodiment 5 further includes the following steps:

The NFC dynamic token determines whether an Electronic Paper Displays (EPD) error event happens, the NFC dynamic token initializes electronic paper in the case that the EPD error event happens. Specifically, the NFC dynamic token determines whether an EPD error identification is set, if yes, the EPD error event happens; otherwise, no EPD error event happens. After the NFC dynamic token determines that an EPD error identification is set, the NFC dynamic token will reset the EPD error identification.

Correspondingly, when the EPD error identification, the press key interruption identification, the NFC communication interruption identification and an automatic screen clearing identification are all reset, the NFC dynamic token resets the event identification.

In addition, before the NFC dynamic token displays information or clears screen, a main control chip in the NFC dynamic token sends a power-on instruction to the electronic paper, detects whether Busy signal is switched from low level to high level in a preset time, if yes, set EPD error identification; after the NFC dynamic token displays information or clears screen, the NFC dynamic token sets the EPD error identification; after the NFC dynamic token displays information or clears screen, the main control chip in the NFC dynamic token sends a power-off instruction to the electronic paper and detects whether the Busy signal is switched from the high level to the low level in a second preset time, if no, set the EPD error identification and the event identification.

After the NFC dynamic token detects the press key interruption, the NFC dynamic token sets the press key interruption identification and the event identification; after detecting that the NFC communication is interrupted, the NFC dynamic token stores the received NFC data in the NFC buffer via NFC channel, sets the NFC communication identification and the event identification; after detecting that RTC is interrupted, the NFC dynamic token updates second number and determines whether the second number reaches a preset time; if yes, update the dynamic factor and set the automatic screen clearing identification and the event identification, initialize the RTC interruption times.

In embodiment 5, RTC interruption happens every second and the preset time is 60 times. After detecting RTC interruption, the NFC dynamic token adds 1 to the second number; after the second number reaches 60 times, the NFC dynamic token initializes the second number to be zero; and after obtaining the first instruction from the NFC data, the NFC dynamic token takes the second number as the random number for encryption to the mobile device.

According to the embodiment 5 of the present invention, the seed key is written in the NFC dynamic token via the NFC channel, which improves flexibility and security of the dynamic token.

Figure 6:
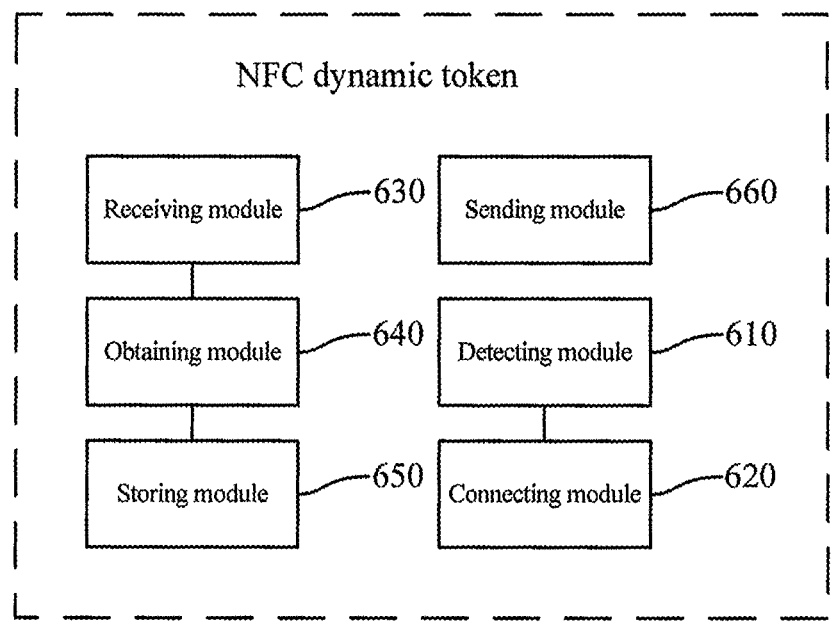
FIG. 6 is a block diagram of modules made up

Based on above method, Embodiment 6 of the present invention provides an NFC dynamic token. As shown in FIG. 6, the NFC token includes:

a detecting module 610 configured to detect whether a preset press key is triggered;

a connecting module 620 configured to, after the detecting module 610 detects that the preset press key is triggered, activate NFC communication, build connection to a mobile device via the NFC channel;

a receiving module 630 configured to receive a second instruction from the mobile device;

an obtaining module 640 configured to obtain a seed key from the second instruction;

a storing module 650 configured to store the seed key;

a sending module 660 configured to send a message that writing is successful to the mobile device via the NFC channel.

In this case, the seed key is seed in plain text;

Correspondingly, the obtaining module 640 is further configured to obtain a check value from the second instruction;

The NFC dynamic token further includes:

a computing module configured to compute the check value according to seed in plaintext;

a determining module configured to determine whether the check value obtained by the computing module is identical to the check value obtained from the second instruction;

the storing module 650 specifically configured to store the seed in plaintext when the check value obtained by computing module 640 is identical to the check value obtained from the second instruction.

The seed key can be seed in ciphertext;

Correspondingly, the obtaining module 640 further configured to obtain the check value from the second instruction;

The NFC dynamic token further includes:

a decrypting module configured to use the last time stored random number for encryption to decrypt the seed in ciphertext to obtain the seed in plaintext;

a computing module configured to compute a check value according to the seed in plaintext;

a determining module configured to determine whether the check value obtained by computing by the computing module is identical to the check value obtained by the obtaining module 640 from the second instruction;

a storing module 650 specifically configured to store the seed in plaintext when the check value obtained by computing is identical to the check value obtained by the obtaining module 640 from the second instruction.

Further, in an embodiment of the preset invention, the receiving module 630 is further configured to receive a first instruction from the mobile device;

a sending module 660 is further configured to send a random number for encryption to the mobile device via NFC channel;

a storing module 650 is further configured to store the random number.

In another embodiment of the present invention, the receiving module 630 further is configured to receive the first instruction from the mobile device;

the storing module 650 is further configured to store a key for writing;

The NFC dynamic token further includes:

an encryption module configured to use the key for writing to encrypt the random number for encryption to obtain a random number in ciphertext;

a sending module 660 further configured to send the random number in ciphertext to the mobile device via the NFC channel;

a storing module 650 further configured to store the random number for encryption.

Further, the receiving module 630 is further configured to receive a fourth instruction from the mobile device;

a sending module 660 is further configured to send the token sequence number to the mobile device via the NFC channel.

Further, the detecting module 610 specifically is configured to determine whether a press key event happens, if yes, the preset press key is determined to be triggered; otherwise, the preset press key is determined not to be triggered;

The NFC dynamic token further includes:

a determining module configured to determine the flow identification after the detecting module 610 determines that a press key event happens;

a connecting module 620 specifically is configured to, after the determining module determines that the flow identification is a preset value, activate NFC communication, build connection with the mobile device via the NFC channel.

Further, the NFC dynamic token further includes:

a setting module configured to, after the determining module determines that the flow identification is a first preset value, set the flow identification as a second preset value; and a clearing module configured to, after the determining module determines that the flow identification is a second preset value, clear screen, shut off NFC communication and set the flow identification as the first preset value.

In another embodiment of the present invention, the seed key is seed in ciphertext;

the obtaining module 640 is further configured to obtain a check value from the second instruction; and the storing module 650 is further configured to store the key for writing;

The NFC dynamic token further includes:

a decrypting module configured to use the key for writing and the last time stored random number for encryption to decrypted the seed in ciphertext to obtain the seed in plaintext;

a computing module configured to compute the check value according to the seed in plaintext.

a determining module configured to determine whether the check value obtained by computing by the computing module is identical to the check value obtained by the obtaining module 640 from the second instruction;

a storing module 650 specifically is configured to store the seed in ciphertext when the check value obtained by computing by the computing module is identical to the check value obtained by the obtaining module from the second instruction.

Further, the receiving module 630 is further configured to receive the first instruction from the mobile device;

the sending module 660 is further configured to send a random number for encryption to the mobile device via the NFC channel; and the storing module 650 is further configured to store the random number for encryption.

According to the embodiment 6 of the present invention, the seed key is written in the NFC dynamic token via the NFC channel, which improves flexibility and security of the dynamic token.

Figure 7:
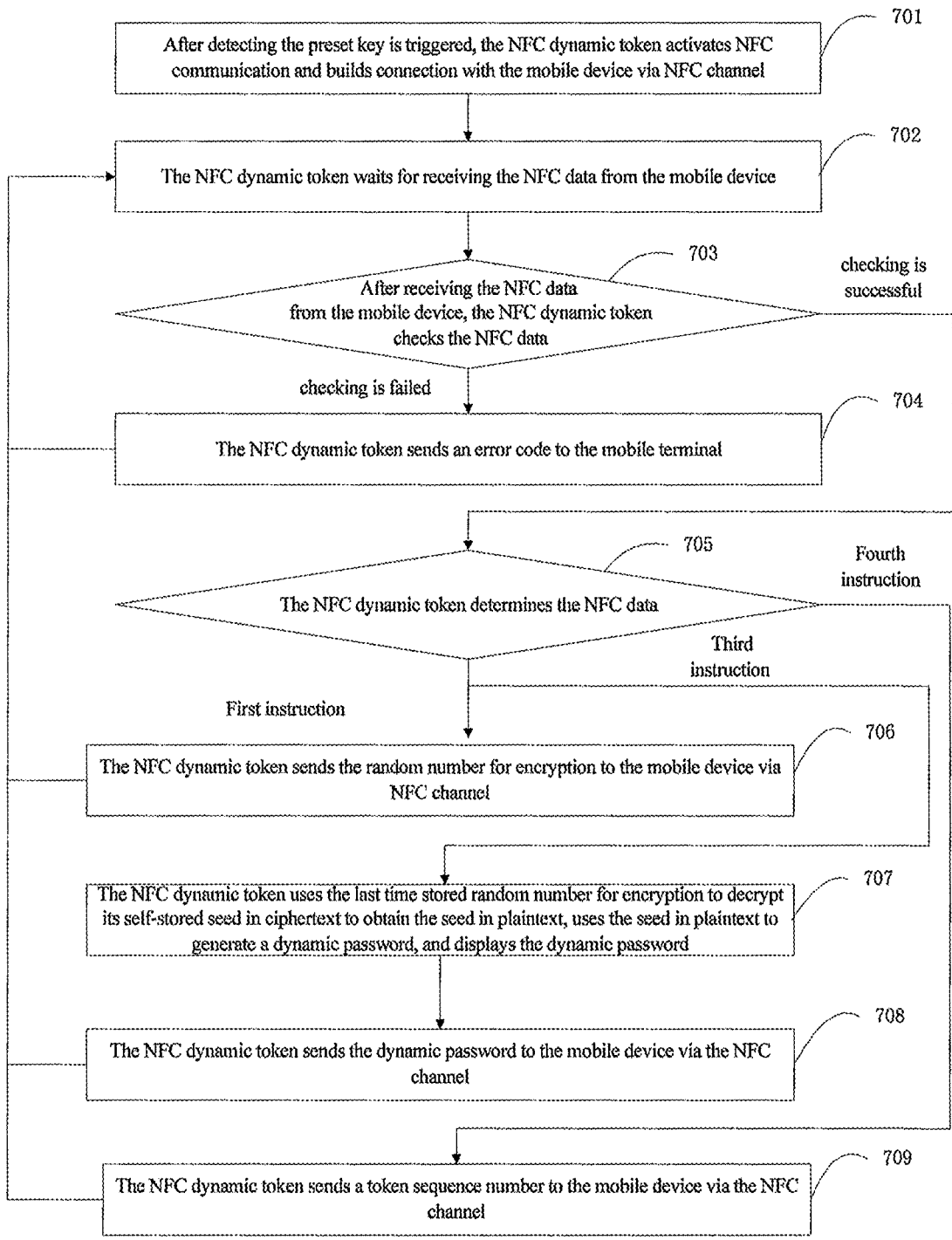
FIG. 7 is a flow chart of a working method of an NFC dynamic token provided by Embodiment 7 of the present invention.

Embodiment 7 of the present invention further provides a working method for NFC dynamic token. As shown in FIG. 7, the working method further includes the following steps:

Step 701, after detecting the preset key is triggered, the NFC dynamic token activates NFC communication and builds connection with the mobile device via NFC channel.

Step 702, the NFC dynamic token waits for receiving the NFC data from the mobile device.

Step 703, after receiving the NFC data from the mobile device, the NFC dynamic token checks the NFC data, if checking is successful, Step 705 is executed; otherwise, Step 704 is executed.

In this case, the NFC data includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 7, the length of the frame header is 1 byte, the length of the length data is 1 byte, the length of check data is 1 byte.

For example, the NFC data is "0×44020110", which includes the frame header "0×44", the length data "0×02", the instruction data "0×01" and the check data "0×10"; the NFC dynamic token performs computing according to the length data "0×02" and the instruction data "0×01" and determines whether the obtained check value is "0×10", if yes, checking is determined to be successful; otherwise, checking is determined to be failed.

Step 704, the NFC dynamic token sends an error code to the mobile terminal, go back to Step 702.

For example, the NFC dynamic token sends the error code "0×BB021E35" to the mobile terminal.

Step 705, the NFC dynamic token determines the NFC data, if the NFC data is a first instruction, execute Step 706; if the NFC data is a third instruction, execute Step 707; if the NFC data is the fourth instruction, execute Step 709.

Specifically, the NFC dynamic token obtains a command code from the instruction data, determines the command code, if the command code is a third preset value, the NFC data is determined to be a first instruction; if the command code is a fourth preset value, the NFC data is determined to be a third instruction; and if the command code is a fifth preset value, the NFC data is determined to be a fourth instruction.

For example, the third preset value is "0×01", the fourth preset value is "0×03", the fifth preset value is "0×04"; the NFC dynamic token determines the command code in the instruction data, if the command code is "0×01", the NFC data is determined to be the first instruction; if the command code is "0×03", the NFC data is determined to be the third instruction; and if the command code is "0×04", the NFC data is determined to be the fourth instruction.

Step 706, the NFC dynamic token sends the random number for encryption to the mobile device via NFC channel, stores the random number for encryption and go back to Step 702.

In this case, the random number for encryption can be part data intercepted from a UTC second number, for example, "0×1326".

It should be noted that the mobile device receives the random number for encryption from the NFC dynamic token and stores the random number for encryption.

Step 707, the NFC dynamic token uses the last time stored random number for encryption to decrypt its self-stored seed in ciphertext to obtain the seed in plaintext, uses the seed in plaintext to generate a dynamic password, and displays the dynamic password.

For example, the NFC dynamic token uses the last time stored random number for encryption, i.e. "0×1326", to decrypt the seed in ciphertext "0×AFCC4F6EAC971346E6" to obtain the seed in plaintext "0×8D5828922FEBFC8597", generates a dynamic password "355569" according to the seed in plaintext and displays the dynamic password "355569".

Step 708, the NFC dynamic token sends the dynamic password to the mobile device via the NFC channel and go back to Step 702.

For example, the NFC dynamic token sends the dynamic password "355569" to the mobile device via the NFC channel.

Step 709, the NFC dynamic token sends a token sequence number to the mobile device via the NFC channel and go back to Step 702.

For example, the NFC dynamic token sends its self-stored token sequence number "15357" to the mobile device via the NFC channel.

It should be noted that, after the NFC dynamic token activates NFC communication, the method further includes that, after detecting that a preset press key is triggered, the NFC dynamic token clears screen and shuts off then NFC communication.

Correspondingly, after the NFC dynamic token clears the screen and shuts off NFC communication, the method further includes that, after detecting that the preset press key is triggered, the NFC dynamic token activates NFC communication and then Step 702 and subsequent steps are executed.

In Embodiment 7, the dynamic password generated by the NFC dynamic token is sent to the mobile device via the NFC channel, which avoids error and leaking secret caused by inputting the dynamic password manually by a user and improves security of the dynamic token.

Figure 8:
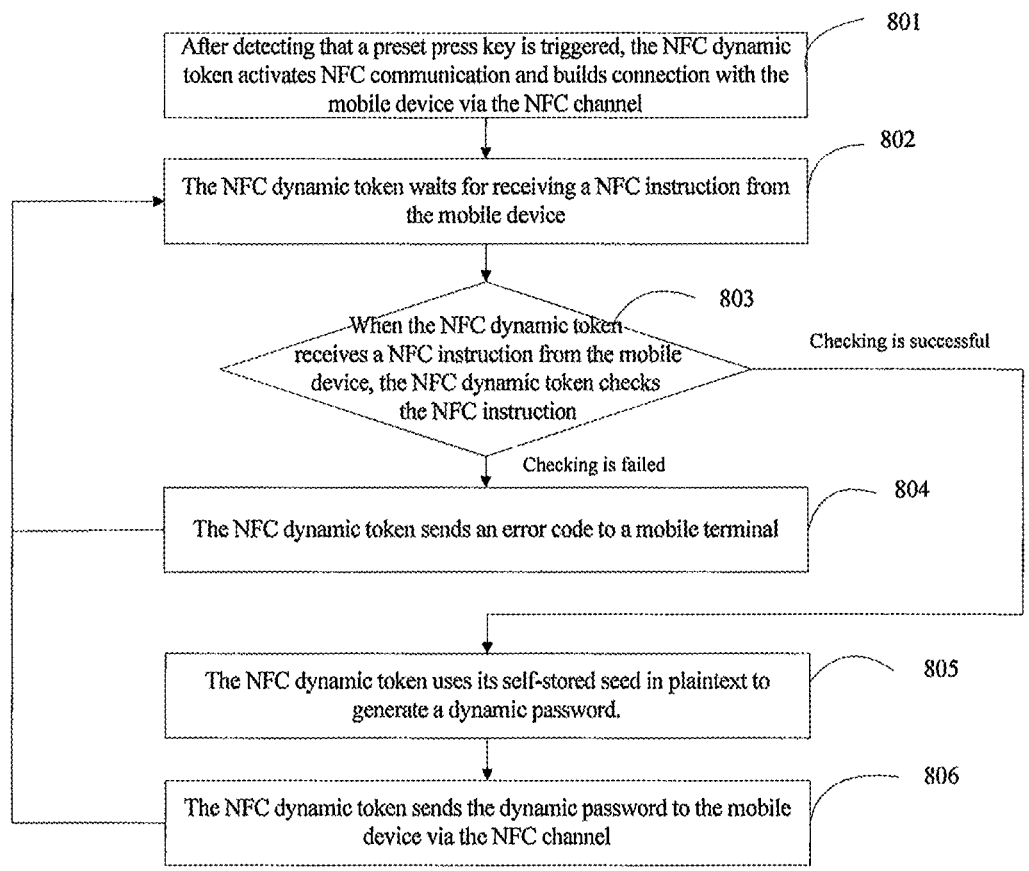
FIG. 8 is a flow chart of another working method of an NFC dynamic token provided by Embodiment 8 of the present invention.

Embodiment 8 of the present invention provides another working method for NFC dynamic token. As shown in FIG. 8, the working method includes the following steps.

Step 801, after detecting that a preset press key is triggered, the NFC dynamic token activates NFC communication and builds connection with the mobile device via the NFC channel.

Step 802, the NFC dynamic token waits for receiving an NFC instruction from the mobile device.

Step 803, when the NFC dynamic token receives an NFC instruction from the mobile device, the NFC dynamic token checks the NFC instruction, if checking is successful, Step 805 is executed; otherwise, Step 804 is executed.

In this case, the NFC data includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 8, the length of the frame header is 1 byte, the length of the length data is 1 byte, the length of check data is 1 byte.

For example, the NFC data is "0×44020110", which includes the frame header "0×44", the length data "0×02", the instruction data "0×01" and the check data "0×10"; the NFC dynamic token performs computing according to the length data "0×02" and the instruction data "0×01" and determines whether the obtained check value is "0×10", if yes, checking is determined to be successful; otherwise, checking is determined to be failed.

Step 804, the NFC dynamic token sends an error code to a mobile terminal, then go back to Step 802.

For example, the NFC dynamic token sends error code "0×BB021E35" to the mobile terminal.

Step 805, the NFC dynamic token uses its self-stored seed in plaintext to generate a dynamic password.

For example, the NFC dynamic token uses its self-stored seed in plaintext, i.e. "0×8D5828922FEBFC8597" to generate the dynamic password "355569".

Step 806, the NFC dynamic token sends the dynamic password to the mobile device via the NFC channel, then go back to Step 802.

For example, the NFC dynamic token sends the dynamic password "355569" to the mobile device via the NFC channel.

It should be noted that, after the NFC dynamic token activates the NFC communication, the method further includes that, after detecting that the preset press key is triggered, the NFC dynamic token clears screen and shuts off the NFC communication.

Correspondingly, after the NFC dynamic token clears the screen and shuts off NFC communication, the method further includes that, after detecting that the preset press key is triggered, the NFC dynamic token activates NFC communication and then Step 802 and subsequent steps are executed.

In Embodiment 8, the dynamic password generated by the NFC dynamic token is sent to the mobile device via the NFC channel, which avoids error and leaking secret caused by inputting the dynamic password manually by a user and improves security of the dynamic token.

Figure 9:
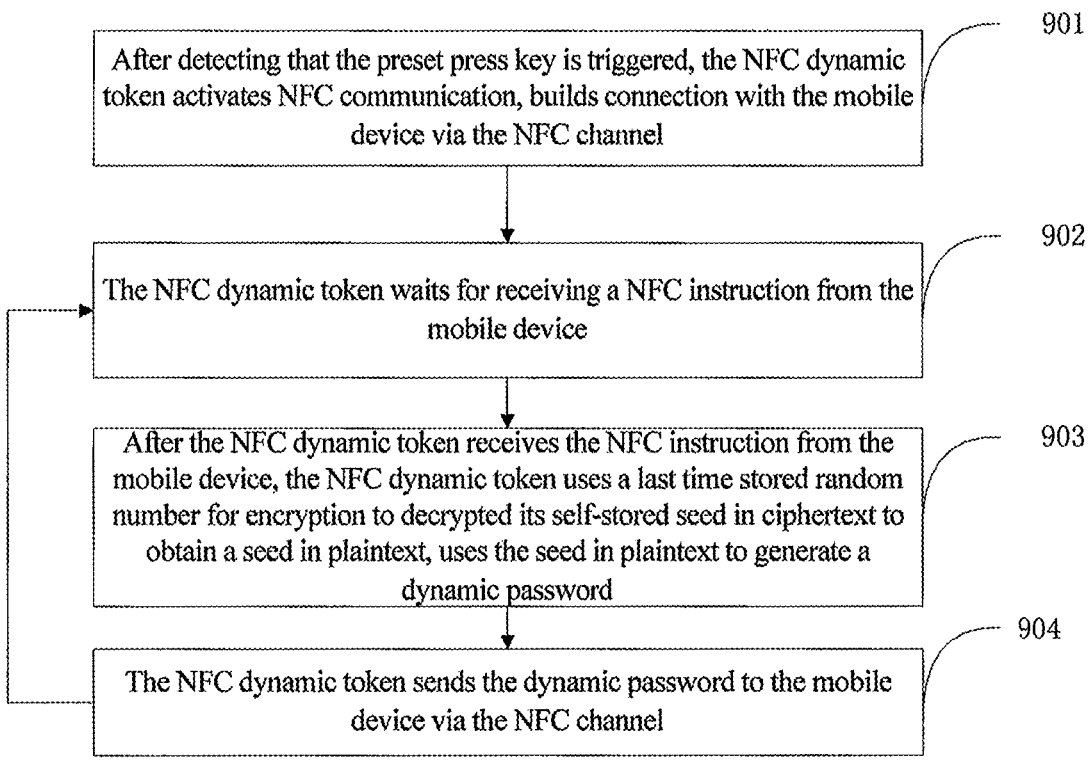
FIG. 9 is a flow chart of another working method of an NFC dynamic token provided by Embodiment 9 of the present invention.

Embodiment 9 of the present invention provides another working method of the NFC dynamic token. As shown in FIG. 9, the working method includes the following steps:

Step 901, after detecting that the preset press key is triggered, the NFC dynamic token activates NFC communication, builds connection with the mobile device via the NFC channel.

Step 902, the NFC dynamic token waits for receiving an NFC instruction from the mobile device.

Step 903, after the NFC dynamic token receives the NFC instruction from the mobile device, the NFC dynamic token uses a last time stored random number for encryption to decrypted its self-stored seed in ciphertext to obtain a seed in plaintext, uses the seed in plaintext to generate a dynamic password.

For example, the NFC instruction is "0×44020110", the NFC dynamic token uses a last time stored random number for encryption, i.e. "0×1326", to decrypt the seed in ciphertext "0×AFCC4F6EAC971346E6" to obtain the seed in plaintext "0×8D5828922FEBFC8597", and generates a dynamic password "355569" according to the seed in plaintext.

Step 904, the NFC dynamic token sends the dynamic password to the mobile device via the NFC channel, and then go back to Step 902.

For example, the NFC dynamic token sends the dynamic password "355569" to the mobile device via the NFC channel.

It should be noted that, after the NFC dynamic token activates the NFC communication, the method further includes that, after detecting that the preset press key is triggered, the NFC dynamic token clears screen and shuts off the NFC communication.

Correspondingly, after the NFC dynamic token clears the screen and shuts off NFC communication, the method further includes that, after detecting that the preset press key is triggered, the NFC dynamic token activates NFC communication and then Step 902 and subsequent steps are executed.

In Embodiment 9, the dynamic password generated by the NFC dynamic token is sent to the mobile device via the NFC channel, which avoids error and leaking secret caused by inputting the dynamic password manually by a user and improves security of the dynamic token.

Figure 10:
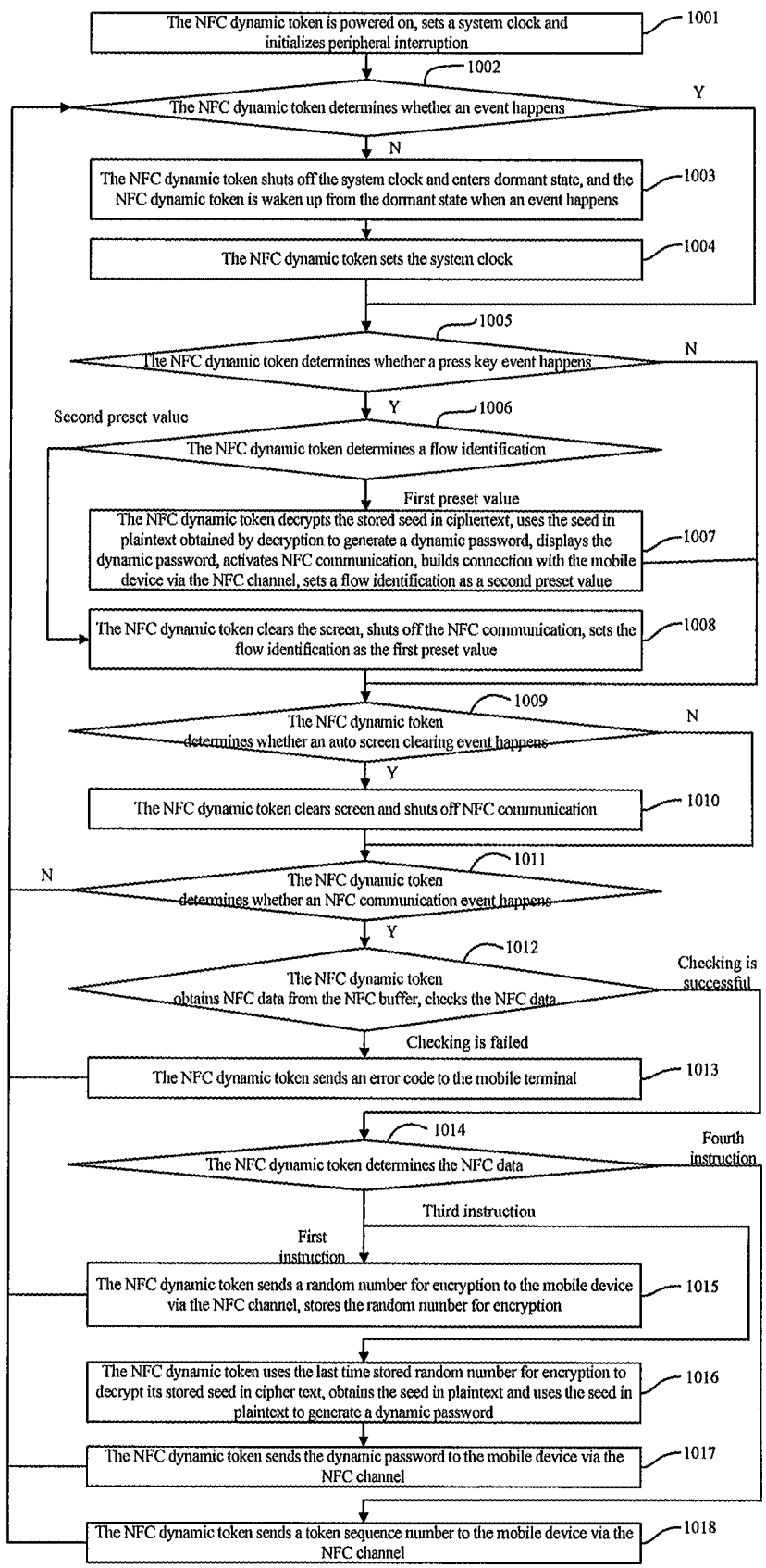
FIG. 10 is a flow chart of another working method of an NFC dynamic token provided by Embodiment 10 of the present invention.

Embodiment 10 of the present invention further provides another working method of NFC dynamic token. As shown in FIG. 10, the working method includes following steps:

Step 1001, the NFC dynamic token is powered on, sets a system clock and initializes peripheral interruption.

Step 1002, the NFC dynamic token determines whether an event happens, if yes, Step 1005 is executed; otherwise, Step 1003 is executed.

Specifically, the NFC dynamic token determines whether an event identification is set, if yes, the event is determined to be happened; otherwise, the event is not determined to be happened.

Step 1003, the NFC dynamic token shuts off the system clock and enters dormant state, and the NFC dynamic token is waken up from the dormant state when an event happens, then Step 1004 is executed.

Step 1004, the NFC dynamic token sets the system clock and Step 1005 is executed.

Step 1005, the NFC dynamic token determines whether a press key event happens, if yes, Step 1006 is executed; otherwise, Step 1009 is executed.

Specifically, the NFC dynamic token determines whether a press key interruption identification is set, if yes, the press key event is determined to be happened; if no, the press key event is not determined to be happed.

It should be noted that, after determining that a press key interruption identification is set, the NFC dynamic token will reset the press key interruption identification.

Step 1006, the NFC dynamic token determines a flow identification, if the flow identification is a first preset value, Step 1007 is executed; if the flow identification is a second preset value, Step 1008 is executed.

For example, the first preset value is "01", the second preset value is "02".

Step 1007, the NFC dynamic token decrypts the stored seed in ciphertext, uses the seed in plaintext obtained by decryption to generate a dynamic password, displays the dynamic password, activates NFC communication, builds connection with the mobile device via the NFC channel, sets a flow identification as a second preset value, and then Step 1009 is executed.

Specifically, the NFC dynamic token uses a last time stored random number for encryption to decrypt a self-stored seed in ciphertext to obtain the seed in plaintext and uses the seed in plaintext to generate a dynamic password.

For example, the NFC dynamic token uses the last time stored random number for encryption, i.e. "0×1326", to decrypted the seed in ciphertext, i.e. "0×AFCC4F6EAC971346E6", obtains the seed in plaintext, i.e. "0×8D5828922FEBFC8597", generates the seed in plaintext to generate a dynamic password "355569", displays the dynamic password "355569" and sets the flow identification as "02".

Step 1008, the NFC dynamic token clears the screen, shuts off the NFC communication, sets the flow identification as the first preset value, then Step 1009 is executed.

For example, the NFC dynamic token sets the flow identification as "01".

Step 1009, the NFC dynamic token determines whether an automatic screen clearing event happens, if yes, execute Step 1010; otherwise, execute Step 1011.

Specifically, the NFC dynamic token determines whether the automatic screen clearing identification is set, if yes, automatic screen clearing event is determined to be happened; otherwise, no automatic screen clearing event is determined to be happened.

It should be noted that, after determining that the automatic screen clearing identification is set, the NFC dynamic token resets the automatic screen clearing identification.

Step 1010, the NFC dynamic token clears screen and shuts off NFC communication, then execute Step 1011.

Step 1011, the NFC dynamic token determines whether an NFC communication event happens, if yes, Step 1012 is executed; otherwise, go back to Step 1002.

Specifically, the NFC dynamic token determines whether the NFC communication interruption identification is set, if yes, the NFC communication event is determined to be happened; otherwise, no NFC communication event is determined to be happened.

It should be noted that, after determining that the NFC communication interruption identification is set, the NFC dynamic token will reset the NFC communication interruption identification.

In addition, after the press key interruption identification, the NFC communication interruption identification and the automatic screen clearing identification are all be reset, the NFC dynamic token will reset the event identification.

Step 1012, the NFC dynamic token obtains NFC data from the NFC buffer, checks the NFC data, if checking is successful, Step 1014 is executed; otherwise, Step 1013 is executed.

In this case, the NFC data includes a frame header, length data, instruction data and check data; value of the length data is sum of length of instruction data and length of check data; correspondingly, the NFC dynamic token can perform computing according to the length data and the instruction data to obtain a check value, determine whether the check value is identical to the value of the check data, if yes, checking the NFC data is determined to be successful; otherwise, checking the NFC data is determined to be failed.

In Embodiment 10, the length of the frame header is 1 byte, the length of the length data is 1 byte, the length of check data is 1 byte.

For example, the NFC data is "0×44020110", which includes the frame header "0×44", the length data "0×02", the instruction data "0×01" and the check data "0×10"; the NFC dynamic token performs computing according to the length data "0×02" and the instruction data "0×01" and determines whether the obtained check value is "0×10", if yes, checking is determined to be successful; otherwise, checking is determined to be failed.

Step 1013, the NFC dynamic token sends an error code to the mobile terminal, and then go back to Step 1002.

For example, the NFC dynamic token sends an error code "0×BB021E35" to the mobile terminal.

Step 1014, the NFC dynamic token determines the NFC data, if the NFC data is a first instruction, Step 1015 is executed; if the NFC data is a third instruction, Step 1016 is executed; if the NFC data is a fourth instruction, Step 1018 is executed.

Specifically, the NFC dynamic token obtains a command code from the instruction data, determines the command code, if the command code is a third preset value, the NFC data is determined to be a first instruction; if the command code is a fourth preset value, the NFC data is determined to be a third instruction; and if the command code is a fifth preset value, the NFC data is determined to be a fourth instruction.

For example, the third preset value is "0×01", the fourth preset value is "0×03", the fifth preset value is "0×04"; the NFC dynamic token determines the command code in the instruction data, if the command code is "0×01", the NFC data is determined to be the first instruction; if the command code is "0×01", the NFC data is determined to be the first instruction; if the command code is "0×03", the NFC data is determined to be the third instruction; if the command code is "0×04", the NFC data is determined to be the fourth instruction.

Step 1015, the NFC dynamic token sends a random number for encryption to the mobile device via the NFC channel, stores the random number for encryption, then go back to Step 402.

In this case, the random number for encryption can be part data intercepted from the UTC second number, for example, "0×1326".

Step 1016, the NFC dynamic token uses the last time stored random number for encryption to decrypt its stored seed in ciphertext, obtains the seed in plaintext and uses the seed in plaintext to generate a dynamic password.

For example, the NFC dynamic token uses the last time stored random number for encryption, i.e. "0×1326" to decrypt the seed in ciphertext "0×AFCC4F6EAC971346E6" and obtains the seed in plaintext "0×8D5828922FEBFC8597", generates the dynamic password "355569" according to the seed in plaintext.

Step 1017, the NFC dynamic token sends the dynamic password to the mobile device via the NFC channel, then go back to Step 1002.

For example, the NFC dynamic token sends the dynamic password "355569" to the mobile device via the NFC channel.

Step 1018, the NFC dynamic token sends a token sequence number to the mobile device via the NFC channel, go back to Step 1002.

For example, the NFC dynamic token sends its self-stored token sequence number "15357" to the mobile device via the NFC channel.

It should be noted that, Embodiment 10 of the present invention further includes the following steps:

the NFC dynamic token determines whether an Electronic Paper Displays (EPD) error event happens, the NFC dynamic token initializes electronic paper if the EPD error event happens. Specifically, the NFC dynamic token determines whether an EPD error identification is set, if yes, the EPD error event happens; otherwise, no EPD error event happens. After the NFC dynamic token determines that an EPD error identification is set, the NFC dynamic token will reset the EPD error identification.

Correspondingly, when the EPD error identification, the press key interruption identification, the NFC communication interruption identification and an automatic screen clearing identification are all reset, the NFC dynamic token resets the event identification.

In addition, before the NFC dynamic token displays information or clears screen, a main control chip in the NFC dynamic token sends a power-on instruction to the electronic paper, detects whether Busy signal is switched from low level to high level in a preset time, if yes, set EPD error identification; after the NFC dynamic token displays information or clears screen, the NFC dynamic token sets the EPD error identification; after the NFC dynamic token displays information or clears screen, the main control chip in the NFC dynamic token sends a power-off instruction to the electronic paper and detects whether the Busy signal is switched from the high level to the low level in a second preset time, if no, set the EPD error identification and the event identification.

After the NFC dynamic token detects the press key interruption, the NFC dynamic token sets the press key interruption identification and the event identification; after detecting that the NFC communication is interrupted, the NFC dynamic token stores the received NFC data in the NFC buffer via NFC channel, sets the NFC communication identification and the event identification; after detecting that RTC is interrupted, the NFC dynamic token updates second number and determines whether the second number reaches a preset time; if yes, update the dynamic factor and set the automatic screen clearing identification and the event identification, initialize the RTC interruption times.

In embodiment 10, RTC interruption happens every second and the preset time is 60 times. After detecting RTC interruption, the NFC dynamic token adds 1 to the second number; after the second number reaches 60 times, the NFC dynamic token initializes the second number to be zero; after obtaining the first instruction from the NFC data, the NFC dynamic token takes the second number as the random number for encryption to the mobile device.

According to the embodiment 10 of the present invention, the dynamic password generated by the NFC token is sent to the NFC dynamic token via the NFC channel, which avoids error and leaking secret caused by inputting the dynamic password manually by a user and improves security of the dynamic token.

Figure 11:
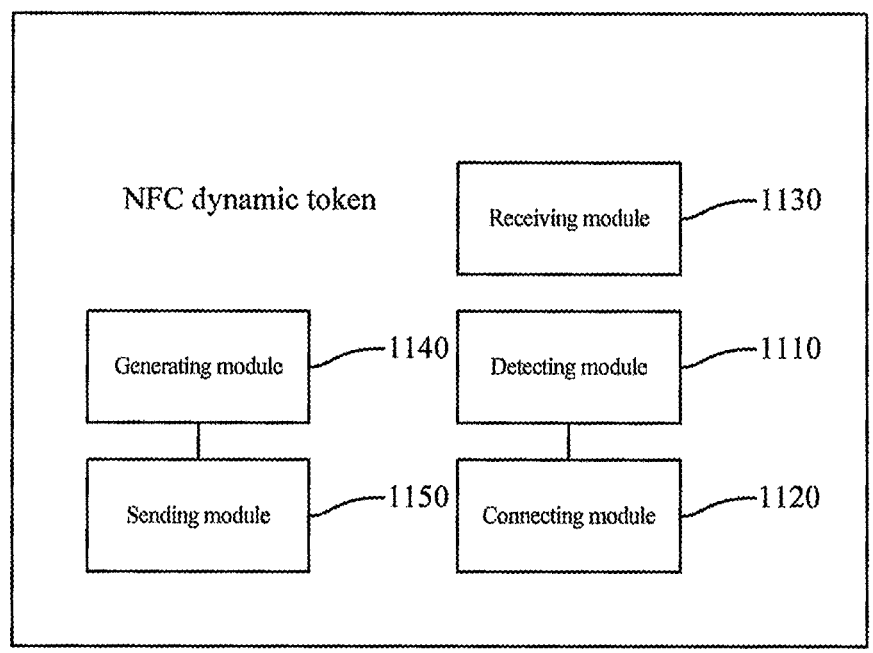
FIG. 11 is a structural diagram of an NFC dynamic token of Embodiment 11 of the present invention.

Based on the working method of the NFC dynamic token, Embodiment 11 further provides an NFC dynamic token. As shown in FIG. 11, the NFC dynamic token includes:

a detecting module 1110 configured to detect whether a preset press key is triggered;

a connecting module 1120 configured to, after the detecting module 1110 detects that the preset press key is triggered, activate the NFC communication, build connection with the mobile device via the NFC channel;

a receiving module 1130 configured to receive a third instruction from the mobile device;

a generating module 1140 configured to generate a dynamic password according to its self-stored seed data; and a sending module 1150 configured to send the dynamic password to the mobile device via the NFC channel.

Further, the NFC dynamic token further includes:

a displaying module configured to display a dynamic password.

In this case, the seed data stored in the NFC dynamic token can be the seed in ciphertext;

Correspondingly, the generating module 1140 specifically is configured to use a last time stored random number for encryption to decrypt its self-stored seed in ciphertext to obtain the seed in plaintext and uses the seed in plaintext to generate a dynamic password.

The receiving module 1130 is further configured to receive the first instruction from the mobile device;

the sending module 1150 is further configured to send a random number for encryption to the mobile device via the NFC channel and store the random number for encryption.

Further, the receiving module 1130 is further configured to receive a fourth instruction from the mobile device;

The sending module 1150 is further configured to send a token sequence number to the mobile device via the NFC channel.

Further, the detecting module 1110 specifically is configured to determine whether a press key event happens, if yes, the preset key is determined to be triggered; otherwise, the preset press key is determined not to be triggered;

further, the NFC dynamic token further includes:

a determining module configured to determine a flow identification after the detecting module 1110 determines a press key event happens;

a connecting module 1120 specifically configured to, when the determining module determines that the flow identification is a first preset value, activate the NFC communication and builds connection with the mobile device via the NFC channel.

Further, the NFC dynamic token further includes:

a setting module configured to, after the determining module determines that the first flow identification is a first preset value, set the flow identification as a second preset value;

a clearing module configured to, after the determining module determines that the flow identification is a second preset value, clear screen, shut off the NFC communication and set the flow identification as the first preset value.

According to the embodiment 11 of the present invention, the dynamic password generated by the NFC token is sent to the NFC dynamic token via the NFC channel, which avoids error and leaking secret caused by inputting the dynamic password manually by a user and improves security of the dynamic token.

It can be understood that all of or part of the steps in the above embodiments can be realized by hardware, a soft module executed by a processor or combination of both. The soft module can be stored in RAM (random-access memory), memory, ROM (read-only memory), electrically programmable read-only memory, electrically erasable programmable read-only memory, register, hard disc, mobile disc, CD-ROM (Compact Disc Read-Only Memory) or any other public known forms of storage media in the prior art.

The described embodiments are only preferred embodiments of the application and the embodiments are not intended to limit the application. Any alteration or change easily obtained by those skilled in the art based on the application should fall in the scope of protection of the application.

The invention claimed is:

1. A working method of an NFC (Near Field Communication) dynamic token, in which said NFC dynamic token is a device for generating a dynamic password in NFC, and a seed key is written into the NFC dynamic token via an NFC channel, wherein said method comprises the following steps:

pressing down a preset key for pressing down to trigger the preset key, activating, by the NFC dynamic token, NFC communication after detecting that the preset key for pressing down is triggered, and building connection with a mobile device via the NFC channel; and obtaining, by the NFC dynamic token, the seed key from a second instruction when the NFC dynamic token receives the second instruction from the mobile device, storing the seed key, and sending a message that writing is successful to the mobile device via the NFC channel, wherein the seed key obtained is used to generate the dynamic password for identity authentication; and the NFC dynamic token wirelessly and externally sends the dynamic password to the mobile device via the NFC channel; then clears a screen showing the dynamic password.

2. The method of claim 1, wherein the seed key is a seed in plaintext;

after the NFC dynamic token receives the second instruction from the mobile device, the method further comprises:

obtaining, by the NFC dynamic token, a first check value from the second instruction;

after the NFC dynamic token receives the seed in plaintext from the second instruction, the method further comprises:

computing, by the NFC dynamic token, a second check value according to the seed in plaintext, and determining whether the second check value obtained by computing is identical to the first check value obtained from the second instruction; and said storing, by the NFC dynamic token, the seed in plaintext comprises: storing, by the NFC dynamic token, the seed in plaintext when the second check value obtained by computing is identical to the first check value obtained from the second instruction.

3. The method of claim 1, wherein the seed key is a seed in ciphertext;

after the NFC dynamic token receives the second instruction from the mobile device, the method further comprises:

obtaining, by the NFC dynamic token, a first check value from the second instruction;

after the NFC dynamic token receives the seed in ciphertext from the second instruction, the method further comprises:

decrypting, by the NFC dynamic token, the seed in ciphertext with a previously stored random number during encryption, so as to obtain the seed in plaintext;

computing, by the NFC dynamic token, a second check value according to the seed in plaintext, and determining whether the second check value obtained by computing is identical to the first check value obtained from the second instruction; and said storing, by the NFC dynamic token, the seed in ciphertext comprises: storing, by the NFC dynamic token, the seed in ciphertext when the second check value obtained by computing is identical to the first check value obtained from the second instruction.

4. The method of claim 1, wherein detecting, by the NFC dynamic token, the preset key for pressing down is triggered comprises:

detecting, by the NFC dynamic token, that a key is pressed down;

after detecting that the key is pressed down by the NFC dynamic token, the method further comprises:

determining, by the NFC dynamic token, a flow identification;

said activating, by the NFC dynamic token, NFC communication and building connection with the mobile device via the NFC channel comprises:

activating, by the NFC dynamic token, NFC communication and building connection with the mobile device via the NFC channel when the NFC dynamic token determines that the flow identification is a first preset value.

5. The method of claim 1, wherein the seed key is a seed in ciphertext;

after the NFC dynamic token receives the second instruction from the mobile device, the method further comprises:

obtaining, by the NFC dynamic token, a first check value from the second instruction;

after the NFC dynamic token receives the seed in ciphertext from the second instruction, the method further comprises:

decrypting, by the NFC dynamic token, the seed key in ciphertext by using a key previously stored in the NFC dynamic token for writing and by using a previously stored random number during encryption, so as to obtain a seed in plain text;

computing, by the NFC dynamic token, a second check value according to the seed in plaintext, and determining whether the second check value obtained by computing is identical to the first check value obtained from the second instruction; and said storing, by the NFC dynamic token, the seed in ciphertext comprises: storing, by the NFC dynamic token, the seed in ciphertext when the second check value obtained by computing is identical to the first check value obtained from the second instruction.

6. An NFC dynamic token, wherein said NFC dynamic token comprises:

a means for detecting whether a preset key for pressing down is triggered;

a means for connecting to activate NFC communication after the means for detecting detects that the preset key for pressing down is triggered and builds connection with a mobile device via an NFC channel;

a means for receiving a second instruction from the mobile device;

a means for obtaining a seed key from the second instruction;

a means for storing the seed key; and a means for sending a message that writing is successful to the mobile device via the NFC channel, wherein the seed key obtained is used to generate a dynamic password for identity authentication; and the NFC dynamic token sends the dynamic password to the mobile device via the NFC channel; then clears a screen showing the dynamic password.

7. The NFC dynamic token of claim 6, wherein the seed key is a seed in plaintext;

the means for obtaining is configured to obtain a first check value from the second instruction;

the NFC dynamic token further comprises:

a means for computing a second check value according to the seed in plaintext;

a means for determining whether the second check value obtained by computing by the means for computing is identical to the first check value obtained from the second instruction by the means for obtaining; and the means for storing is configured to store the seed in plaintext when the second check value obtained by computing by the means for computing is identical to the first check value obtained from the second instruction by the means for obtaining.

8. The NFC dynamic token of claim 6, wherein the seed key is a seed in ciphertext;

the means for obtaining is further configured to obtain the first check value from the second instruction;

the NFC dynamic token further comprises:

a means for decrypting the seed in ciphertext with a previously stored random number during encryption, so as to obtain the seed in plaintext;

a means for computing the second check value according to the seed in plaintext;

a means for determining whether the second check value obtained by computing by the means for computing is identical to the first check value obtained by the means for obtaining from the second instruction; and the means for storing the seed in the plaintext when the second check value obtained by computing by the means for computing is identical to the first check value obtained by the means for obtaining from the second instruction.

9. The NFC dynamic token of claim 6, wherein the means for detecting is configured to determine whether a key is pressed down, if yes, the preset key for pressing down is determined to be triggered; otherwise, the preset key for pressing down is determined not to be triggered;

the NFC dynamic token further comprises:
a means for determining a flow identification after the means for detecting determines that a key is pressed down for a triggering event to occur;
a means for connecting is configured to, after the means for determining determines that the flow identification is a preset value, activate NFC communication, and build connection with the mobile device via the NFC channel.

10. The NFC dynamic token of claim 6, wherein the seed key is a seed in ciphertext;
the means for obtaining is further configured to obtain a first check value from the second instruction; and
the means for storing is further configured to store a key for writing;
the NFC dynamic token further comprises:
a means for decrypting configured to use the key for writing and a previously stored random number during encryption to reversibly decrypt the seed in ciphertext, so as to obtain the seed in plaintext;
a means for computing a second check value according to the seed in plaintext;
a means for determining whether the second check value obtained by computing by the means for computing is identical to the first check value obtained by the means for obtaining from the second instruction;
a means for storing the seed in ciphertext when the second check value obtained by computing by the means for computing is identical to the first check value obtained by the means for obtaining from the second instruction.

11. A working method of an NFC dynamic token whose seed key is written into the NFC dynamic token via an NFC channel, wherein said method comprises the following steps:
activating, by the NFC dynamic token, NFC communication after detecting that a preset key for pressing down is triggered, and building connection with a mobile device via an NFC channel;
generating, by the NFC dynamic token, a dynamic password by using a seed key written into the NFC dynamic token when the NFC dynamic token receives a third instruction from the mobile device, and sending the dynamic password to the mobile device via the NFC channel; then clearing a screen showing the dynamic password.

12. The method of claim 11, wherein
after generating, by the NFC dynamic token, the dynamic password by using the seed key written into the NFC dynamic token, the method further comprises:
displaying, by the NFC dynamic token, the dynamic password.

13. The method of claim 11, wherein the seed key of the NFC dynamic token is in ciphertext;
said generating, by the NFC dynamic token, the dynamic password by using the seed key comprises:
using, by the NFC dynamic token, a previously stored random number to encrypt for encrypting a seed, to reversibly decrypt the seed in ciphertext stored in the NFC dynamic token, so as to obtain the seed in plaintext, and using the seed in plaintext to generate the dynamic password.

14. The method of claim 11, wherein detecting, by the NFC dynamic token, the preset key for pressing down is triggered comprises:
detecting, by the NFC dynamic token, that a key is pressed down;
after detecting that the key is pressed down by the NFC dynamic token, the method further comprises:
determining, by the NFC dynamic token, a flow identification;
said activating, by the NFC dynamic token, NFC communication and building connection with the mobile device via an NFC channel comprises:
activating, by the NFC dynamic token, NFC communication and building connection with the mobile device via NFC channel when the NFC dynamic token determines that the flow identification is a first preset value.

15. An NFC dynamic token whose seed key is written into the NFC dynamic token via an NFC channel, wherein said NFC dynamic token comprises:
a means for detecting whether a preset key for pressing down is triggered;
a means for connecting configured to, after the means for detecting detects that the preset key for pressing down is triggered, activate an NFC communication, and build connection with a mobile device via an NFC channel;
a means for receiving a third instruction from the mobile device;
a means for generating a dynamic password according to the seed data; and
a means for sending the dynamic password to the mobile device via the NFC channel; then clearing a screen showing the dynamic password.

16. The NFC dynamic token of claim 15, wherein the NFC dynamic token further comprises: a means for displaying the dynamic password.

17. The NFC dynamic token of claim 15, wherein the seed key stored by the NFC dynamic token is a seed in ciphertext;
the means for generating is configured to use a previously stored random number to for encrypting a seed, to reversibly decrypt the seed in ciphertext stored in the means for generating, so as to obtain the seed in plaintext and use the seed in plaintext to generate the dynamic password.

18. The NFC dynamic token of claim 15, wherein the means for detecting is configured to determine whether a key is pressed down, if yes, the preset key for pressing down is determined to be triggered; otherwise, the preset key for pressing down is determined not to be triggered;
the NFC dynamic token further comprises:
a means for determining a flow identification after the means for detecting determines a key is pressed down for a triggering even to occur;
a means for connecting configured to, when the means for determining determines that the flow identification is a first preset value, activate the NFC communication and build connection with the mobile device via the NFC channel.

* * * * *